United States Patent
Eisenmann et al.

(10) Patent No.: US 10,831,333 B2
(45) Date of Patent: Nov. 10, 2020

(54) MANIPULATING A CAMERA PERSPECTIVE WITHIN A THREE-DIMENSIONAL SPACE

(71) Applicant: Adobe Inc.

(72) Inventors: Jonathan Eisenmann, San Francisco, CA (US); Bushra Mahmood, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 232 days.

(21) Appl. No.: 15/660,284

(22) Filed: Jul. 26, 2017

(65) Prior Publication Data

US 2019/0034056 A1 Jan. 31, 2019

(51) Int. Cl.
*G06F 3/0481* (2013.01)
*G06T 19/00* (2011.01)
*G06T 19/20* (2011.01)
*G06T 15/20* (2011.01)

(52) U.S. Cl.
CPC .......... *G06F 3/04815* (2013.01); *G06T 15/20* (2013.01); *G06T 19/003* (2013.01); *G06T 19/006* (2013.01); *G06T 19/20* (2013.01); *G06T 2200/24* (2013.01); *G06T 2219/2004* (2013.01)

(58) Field of Classification Search
CPC ............. G06F 3/04815; G06F 3/04842; G06F 3/0488; G06F 3/0346; G06F 3/04845
See application file for complete search history.

(56) References Cited

U.S. PATENT DOCUMENTS

| | | | |
|---|---|---|---|
| 8,966,356 B1 * | 2/2015 | Hickman | G06T 15/20 715/208 |
| 10,692,274 B2 * | 6/2020 | Lim | G06T 17/20 |
| 2014/0228118 A1 * | 8/2014 | Hardy | G06T 19/006 463/31 |
| 2015/0074611 A1 * | 3/2015 | Kontkanen | G06F 3/04815 715/850 |
| 2015/0356787 A1 * | 12/2015 | Abe | G06F 3/0346 345/633 |
| 2018/0068488 A1 * | 3/2018 | Hart | G06F 3/04815 |
| 2018/0113596 A1 * | 4/2018 | Ptak | G06F 3/04815 |
| 2018/0144547 A1 * | 5/2018 | Shakib | G06T 15/60 |

OTHER PUBLICATIONS

Jayanam in "Blender Compositing Images and 3D Objects" published on Nov. 15, 2016 , 0:00-11:38, source: youtube.com, (Year: 2016).*

Jonathan Lampel in "The Beginners Guide to Blender" published on 2015, last modified May 5, 2017, pp. 1-53, source: https://www.blenderhd.com/wp-content/uploads/2015/08/ (Year: 2015).*

* cited by examiner

*Primary Examiner* — Ariel Mercado
(74) *Attorney, Agent, or Firm* — Keller Jolley Preece

(57) ABSTRACT

The present disclosure is directed toward systems and methods for manipulating a camera perspective within a digital environment for rendering three-dimensional objects against a background digital image. In particular, the systems and methods described herein display a view of a three-dimensional space including a horizon, a ground plane, and a three-dimensional object in accordance with a camera perspective of the three-dimensional space. The systems and methods further manipulate the camera perspective in response to, and in accordance with, user interaction with one or more options. The systems and methods manipulate the camera perspective relative to the three-dimensional space and thereby change the view of the three-dimensional space within a user interface.

20 Claims, 10 Drawing Sheets

MANIPULATING A CAMERA PERSPECTIVE WITHIN A THREE-DIMENSIONAL SPACE

BACKGROUND

When rendering a three-dimensional object against a two-dimensional background image, it is desirable to make the three-dimensional object look like it is part of the environment of the background image. For example, it is generally desirable to render the three-dimensional object so that the visual perspective of the three-dimensional object fits with the environment of the background image. When a three-dimensional object is poorly positioned or oriented, it is generally obvious to an observer that the object does not belong. Thus, it is important to be able to adjust a three-dimensional object to align with attributes of the background image to more naturally fit the background image. Conventional systems, however, present several disadvantages to users when rendering and aligning three-dimensional objects against a two-dimensional background image.

For example, conventional systems generally require a high level of sophistication on the part of the user. In particular, while conventional systems enable an image editing user to insert and manipulate a three-dimensional object in a workspace, conventional systems have complicated tools for maneuvering three-dimensional objects within the workspace. For example, the tools of some conventional systems require complex knowledge of rotational variables to properly utilize them, while other conventional systems provide little or no context accompanying the tools for maneuvering a three-dimensional object, thereby relying on user sophistication to understand the effects of the tools and how to use them properly. Accordingly, conventional systems are more difficult for a wider user base.

Additionally, conventional systems are more time consuming because conventional systems rely on user perception to maneuver a three-dimensional object to fit against a background image. For example, while conventional systems do afford users freedom to maneuver a three-dimensional object, conventional systems provide little reference information to aid a user in properly positioning and/or orienting the three-dimensional object. Therefore, conventional systems rely on a user's own artistic sense to achieve proper aesthetics when maneuvering a three-dimensional object to fit with a background image in a sort of "free-hand" approach. Thus, conventional systems are more time consuming because many maneuvers and corrections may be required before a three-dimensional object is placed satisfactorily.

As a further result of their reliance on user perception and maneuvering, conventional systems are less precise. In particular, by requiring a user to judge whether a three-dimensional object is properly positioned and oriented within a workspace, conventional systems have a greater likelihood of error. Additionally, conventional systems provide a set number of tools for maneuvering a three-dimensional object, which tools are limiting in functionality. In other words, the chance of an object looking less natural against a background image is greater in conventional systems. Thus, because conventional systems generally rely on a user's own judgment as well as less functional tools when positioning a three-dimensional object, conventional systems are less precise.

Thus, there are several disadvantages with regard to conventional object rendering systems.

SUMMARY

One or more embodiments described herein provide benefits and solve one or more of the foregoing or other problems in the art with systems and methods for manipulating a camera perspective relative to a three-dimensional space that includes a three-dimensional object. In particular, the systems and methods described herein provide options (e.g., buttons or other user-selectable elements) for manipulating a camera perspective to adjust a view of a three-dimensional space as displayed within a user interface. For example, rather than requiring a user with a sophisticated knowledge of three-dimensional object manipulation, the systems and methods described herein provide more intuitive two-dimensional tools for manipulating a three-dimensional camera perspective. Accordingly, the user is able to perform complex three-dimensional manipulations without the knowledge of rotational variables required by conventional systems. The systems and methods display the view of the three-dimensional space overlaid against a background digital image (e.g., a two-dimensional image). Generally, the three-dimensional space includes a horizon (e.g., a transverse line across the background digital image that represents a horizon), a ground plane extending from the horizon, and a three-dimensional object (e.g., an object with attributes in three dimensions but that is rendered in two dimensions within a digital medium environment of a user interface). Additionally, the view of the three-dimensional space portrays, within the user interface, those portions of the horizon, the ground plane, and the three-dimensional objects that are visible to a user from a given camera perspective. For example, as a camera revolves around a cube, different portions of the cube are visible to a user at different intervals throughout one revolution of the camera perspective (e.g., without changing the background digital image).

The systems and methods also include receiving user interaction (e.g., user input) to manipulate (e.g., translate, rotate, etc.) the camera perspective of the three-dimensional space. To illustrate, the systems and methods manipulate the camera perspective of the three-dimensional space to adjust the view of the three-dimensional space relative to the horizon, the ground plane, and/or the three-dimensional object. By so doing, the systems and methods adjust the viewable portions of the horizon, the ground plane, and/or the three-dimensional object. For example, the systems and methods change a pitch or rotation of the camera perspective which results in portraying the horizon, the ground plane, and/or the three-dimensional object from a different angle (e.g., by displaying different views of a three-dimensional object aligned with and overlaid on a two-dimensional image). Thus, the systems and methods provide tools to help a user more easily align and adjust the position of a three-dimensional object against the background of a two-dimensional image.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
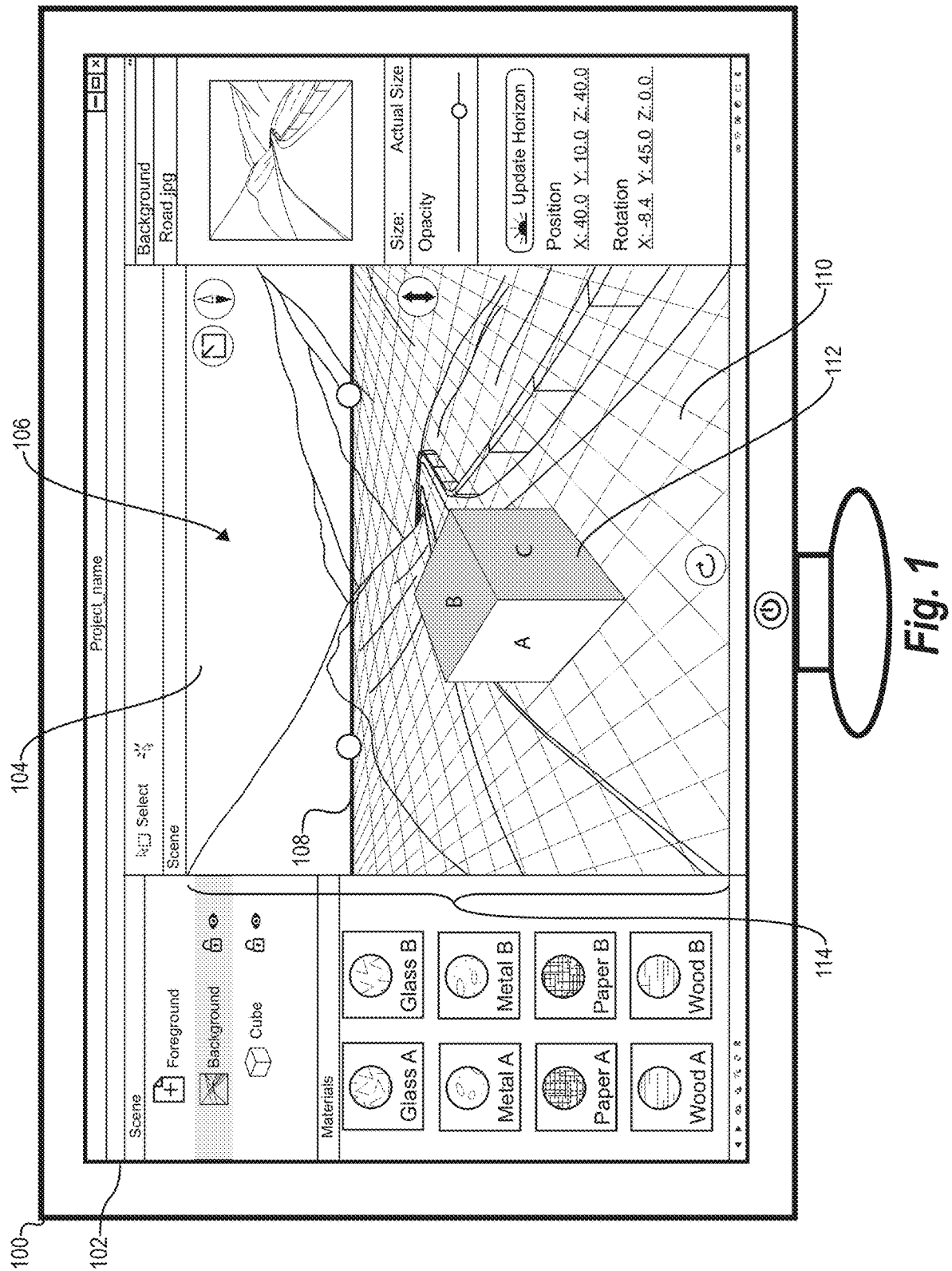
FIG. 1 illustrates an example user interface including a three-dimensional space in accordance with one or more embodiments.

One or more embodiments described herein provide benefits and solve one or more of the foregoing or other problems in the art with a camera perspective system for manipulating a camera perspective relative to a three-dimensional space. The three-dimensional space generally includes a horizon (e.g., a transverse line across the background digital image that represents a horizon) and a ground plane extending from the horizon. In particular, the camera perspective system described herein provide options (e.g., buttons or other user-selectable elements) for manipulating a camera perspective to adjust a view of a three-dimensional space as displayed within a user interface.

The camera perspective system places a three-dimensional object (e.g., an object with attributes in three dimensions but that is rendered in two dimensions within a digital medium environment of a user interface) within the three-dimensional space as an overlay of a background digital image. The camera perspective system displays the view of the three-dimensional space overlaid against a background digital image (e.g., a two-dimensional image) in accordance with a camera perspective. Additionally, the camera perspective system aligns the three-dimensional object with the background digital image by aligning the view of the three-dimensional space to position the three-dimensional object relative to the background digital image. Indeed, the view of the three-dimensional space portrays, within the user interface, those portions of the horizon, the ground plane, and the three-dimensional object that are visible to a user from a given camera perspective. For example, as a camera revolves around a cube, different portions of the cube are visible to a user at different intervals throughout one revolution of the camera perspective.

The camera perspective system also receives user interaction (e.g., user input) to manipulate (e.g., translate, rotate, etc.) the camera perspective of the three-dimensional space. As used herein, a user interaction refers to a user selection (e.g., by way of a mouse click, stylus touch, finger press, etc.) or other interaction with an option for manipulating the camera perspective. Additionally, a user interaction refers to a user input by way of an input field such as, for example, an input field for directly inputting values of a positional coordinate and/or a rotational coordinate, as described in further detail below.

To illustrate, the camera perspective system manipulates the camera perspective of the three-dimensional space to adjust the view of the three-dimensional space relative to the horizon, the ground plane, and/or the three-dimensional object. By so doing, the camera perspective system adjusts the viewable portions of the horizon, the ground plane, and/or the three-dimensional object. For example, the camera perspective system changes a pitch or rotation of the camera perspective which results in portraying the horizon, the ground plane, and/or the three-dimensional object from a different position, vantage, or angle (e.g., by displaying different viewable portions).

The camera perspective system described herein provides (e.g., renders), against a background digital image (e.g., a background of an image editing workspace that is made up of a digital image), a view of a three-dimensional space that includes a horizon, a ground plane, and a three-dimensional object. For illustrative purposes, the horizon of the three-dimensional space is generally a transverse line that spans across the background digital image. The ground plane extends from the horizon, and, in at least one embodiment, the three-dimensional object is connected to (e.g., lies on) the ground plane, as described in greater detail below with reference to the figures.

Generally, the camera perspective system provides a view of the three-dimensional space as it would appear from a given camera perspective—that is, the camera perspective system provides a view of the three-dimensional space that portrays the portions of the three-dimensional space (e.g., the horizon, the ground plane, and the three-dimensional object) that are visible from the given camera perspective. The camera perspective of the three-dimensional space has a number of attributes associated thereto such as, for example, a pitch, a roll, a yaw, and an altitude. Each of the attributes of the camera perspective space affect the positioning and/or orientation of the camera perspective relative to the three-dimensional space. Accordingly, as a result of changing the pitch, roll, yaw, and/or altitude of the camera perspective, the camera perspective system presents a view of the three-dimensional space that changes in accordance with the changes to the camera perspective. Consequently, the camera perspective system presents (e.g., by way of a user interface) changing portions of the three-dimensional space that are visible to a user (e.g., by way of the user interface) as the camera perspective changes.

To that end, the camera perspective system provides a plurality of options (e.g., user selectable elements within a user interface) for manipulating the camera perspective of the three-dimensional space. For example, the camera perspective system provides, to a user by way of a user interface, an option for manipulating the pitch of the camera perspective, an option for manipulating the roll of the camera perspective, an option for manipulating the yaw of the camera perspective, and/or an option for manipulating the altitude of the camera perspective.

To illustrate, the camera perspective system receives an input (e.g., a user interaction with a user-selectable option) to manipulate one of the camera perspective attributes mentioned above. Accordingly, the camera perspective system manipulates the camera perspective in response to, and in accordance with, the user interaction—by adjusting a pitch, roll, yaw, and/or altitude. For example, the camera perspective system adjusts the view (e.g., changes the viewable portions) of the three-dimensional space relative to the horizon, the ground plane, and/or the three-dimensional object of the three-dimensional space according to the user interaction.

Additional detail regarding each of the camera perspective attributes (e.g., pitch, roll, yaw, and altitude) and the options for manipulating each camera perspective attribute is provided below with reference to the figures.

The camera perspective system described herein provides several advantages over conventional systems. For example, the camera perspective system, by providing (e.g., creating or rendering) a view of a three-dimensional space including a horizon, a ground plane, and/or a three-dimensional object, provides more reference of image perspective to a user. In other words, the camera perspective system provides reference points such as the horizon and the ground plane overlaid against a background digital image that provide a greater perspective to the user. Indeed, in at least one embodiment, the camera perspective system renders the horizon and the ground plane of the three-dimensional space as an overlay of the background digital image so that the horizon and the ground plane match (e.g., partially or substantially match) or align with traits of the background digital image. Thus, the camera perspective system described herein is more intuitive than conventional systems, which require more sophistication, an understanding of complex rotational variables, and advanced artistic ability.

By providing references in the three-dimensional space for a greater user perspective—i.e., by providing two-dimensional indicators for manipulating three-dimensional space—the camera perspective system increases usability over conventional systems, reaching a wider user base. In particular, the camera perspective system requires a lesser degree of user sophistication compared to conventional systems when manipulating the camera perspective relative to the three-dimensional space. For example, the camera perspective system described herein provides user-selectable options to manipulate the camera perspective of the entire three-dimensional space at once, rather than conventional systems that require a user to manipulate each item (e.g., three-dimensional object, horizon, ground plane, etc.) independently, which can sometimes result in difficulty for a user to manipulate each item uniformly.

Additionally, the camera perspective system described herein is less time consuming than conventional systems. Because the camera perspective system provides options for manipulating the camera perspective relative to the three-dimensional space, the camera perspective system is faster than conventional systems that rely on user perception. For instance, the camera perspective system described herein enables a user to manipulate the camera perspective of the whole three-dimensional space at once, including a horizon, a ground plane, a three-dimensional object, etc. Thus, the camera perspective system maintains a consistency of perspective of each item within the three-dimensional space without requiring a user to take the time to manipulate each item individually. Furthermore, the camera perspective system described herein is also more precise than conventional systems. Whereas conventional systems rely on user judgment to determine whether a three-dimensional object is properly positioned and/or oriented relative to a background image, the camera perspective system provides the view of the three-dimensional space overlaid against a background digital image for greater accuracy. Thus, the camera perspective system has a lesser likelihood of erroneously placing an object against a background.

More detail regarding the camera perspective system will now be provided with reference to the figures. In particular, FIG. 1 illustrates a computing device 100 including a user interface 102 displayed by the computing device 100. Additionally, the user interface 102 includes various user-selectable options, windows, tools, and other features of a digital medium environment for editing a digital image and/or rendering a three-dimensional object against a background. As shown in FIG. 1, the user interface 102 includes a background digital image 104, and a view of a three-dimensional space 106 overlaid onto the background digital image 104. As used herein, a background digital image refers to an image of a digital format (e.g., JPEG, GIF, PNG, BMP, or other format) that the camera perspective system uses as a background within a workspace. As shown in FIG. 1, the background digital image 104 is a scene of a road through a hilly landscape.

As mentioned, FIG. 1 illustrates a three-dimensional space 106. As used herein, a three-dimensional space refers to a workspace in three dimensions (e.g., width, height, and depth) that is rendered within a two-dimensional user interface 102. In particular, the entirety of a three-dimensional space is generally larger than the viewable portion of the workspace. For example, as shown in FIG. 1, the three-dimensional space 106 is shown within viewing pane 114 of user interface 102. The three-dimensional space 106 extends beyond that area which is visible within the viewing pane 114 so that, in response to user interaction to manipulate the camera perspective relative to the three-dimensional space, the view of viewing pane 114 is always within the three-dimensional space, so to speak. Additionally, the three-dimensional space 106 includes a horizon 108, a ground plane 110, and a three-dimensional object 112. In at least one embodiment, the three-dimensional space 106 includes a horizon 108 and a ground plane 110, and does not include a three-dimensional object such as three-dimensional object 112. In these embodiments, the camera perspective system creates a three-dimensional object (e.g., three-dimensional object 112) to include within the three-dimensional space 106 in response to user input.

As used herein, a three-dimensional object is a digital object, model, or other construct having three dimensions (e.g., width, height, and depth) that is portrayed within a two-dimensional user interface 102. A three-dimensional object (e.g., three-dimensional object 112) can include various attributes associated thereto such as, for example, a material composition, reflectiveness, light absorption, opacity, shape, etc. For example, as shown in FIG. 1, the three-dimensional object 112 is a cube having six sides, three of which are visible (sides A, B, and C). Although FIG. 1 illustrates a cube, in various other examples, the three-dimensional object 112 can be a different shape such as, for example, a sphere, a cylinder, a pyramid, etc. Additionally, the three-dimensional object 112 can include more complex shapes, colors, patterns, or other traits such as those of an origami crane, a guitar, a car, a figurine, or other shape. Indeed, in these or other embodiments, the three-dimensional object 112 may refer to an imported three-dimensional object of any suitable shape, so long as it is in a format compatible with the camera perspective system.

As used herein, a horizon is an element of a three-dimensional space (e.g., three-dimensional space 106). Generally, a horizon refers to a transverse line that spans the three-dimensional space, distinguishing between a first portion (e.g., a "sky" portion) of the three-dimensional space that is above (e.g., in a first direction relative to) the horizon and a second portion (e.g., a "ground" portion) of the three-dimensional space that is below (e.g., in a second direction relative to) the horizon. The horizon is an object of reference for the camera perspective system, defining the farthest visible "distance" from the camera perspective—i.e., where the "sky" portion of the three-dimensional space meets the "ground" portion of the three-dimensional space.

For example, as illustrated in FIG. 1, the horizon 108 of three-dimensional space 106 separates the ground plane 110 from the "sky" portion of the three-dimensional space 106. As also used herein, a ground plane is another element of a three-dimensional space (e.g., three-dimensional space 106). A ground plane generally extends from a horizon (e.g., horizon 108) and defines a flat "ground" surface on which objects (e.g., three-dimensional object 112) can lie. For example, as shown in FIG. 1, the ground plane 110 extends from the horizon 108, and three-dimensional object 112 lies on ground plane 110.

As further illustrated by FIG. 1, the camera perspective system displays a view (e.g., the view as shown in viewing pane 114) of the three-dimensional space 106. The view includes elements of the three-dimensional space 106 such as the horizon 108, the ground plane 110, and the three-dimensional object 112. The camera perspective system displays the view of the three-dimensional space 106 as an overlay against the background digital image 104. More particularly, in some embodiments, the camera perspective system maintains a constant view of the background digital image 104 (e.g., the background digital image 104 appears not to move) as the camera perspective system manipulates the camera perspective together with the background digital image 104 in accordance with the description provided below. As used herein, a view of a three-dimensional space is a portrayal or depiction of portions of a three-dimensional space (e.g., three-dimensional space 106) that are visible to a user by way of a user interface (e.g., user interface 102) from a given camera perspective.

For example, as shown in FIG. 1, the view of the three-dimensional space 106 is the portions of the horizon 108, the ground plane 110, and the three-dimensional object 112 (e.g., sides A, B, and C) that are visible within the viewing pane 114. The camera perspective system can change the view of the three-dimensional space 106—and thereby change the viewable portions of the horizon 108, the ground plane 110, and/or the three-dimensional object 112—by manipulating the camera perspective, much like a photographer can photograph different portions of the same scene by changing a viewing angle or viewing position of the camera.

As shown in FIG. 1, the horizon 108 is not aligned with the background digital image 104. In other words, the view of the three-dimensional space 106 within viewing pane 114 depicts the horizon 108 above a desirable horizon of the background digital image 104. The camera perspective system provides, to a user by way of the user interface 102, options for manipulating the camera perspective of the three-dimensional space 106 to fix the alignment with the background digital image 104. As used herein, options for manipulating a camera perspective of a three-dimensional space (e.g., three-dimensional space 106) refers to user-selectable options such as buttons, slider bars, input fields, icons, or other objects that are selectable via user interaction with a keyboard, touch screen, mouse, touch pad, or other user input device.

In response to receiving user input via a user interaction with an option to manipulate the camera perspective of the three-dimensional space 106, the camera perspective system manipulates the camera perspective of the three-dimensional space 106 in accordance with (e.g., proportionally to) the user input. For example, the camera perspective system receives a user interaction with an option to manipulate a pitch of the camera perspective. The camera perspective system adjusts the pitch of the camera perspective accordingly. As used herein, a pitch refers a vertical angle of the camera perspective relative to the three-dimensional space 106. In at least one embodiment, the pitch of the camera perspective is measured with respect to the horizon 108.

Additionally or alternatively, the camera perspective system receives a user interaction with an option to manipulate a roll of the camera perspective. As used herein, a roll of the camera perspective refers to a stationary rotation of the camera perspective—i.e., where it appears that the camera perspective rotates but does not change position. In other words, a roll of the camera perspective is akin to a twisting motion, where the perspective of the camera rotates in place. In other terms, a roll of the camera perspective refers to a rotation about an axis extending perpendicularly outward from the user interface 102, or extending straight forward from the camera perspective.

Additionally or alternatively still, the camera perspective system receives a user interaction with an option to manipulate a yaw of the camera perspective. As used herein a yaw of the camera perspective refers to a motion of the camera perspective as the camera perspective circumvolves (e.g., travels along a circumferential path or revolves) around a point within a three-dimensional space (e.g., three-dimensional space 106). As an example, a yaw refers a distance along an arc (e.g., part of a circular path) that the camera perspective travels as part of a circumvolution around the three-dimensional object 112 (e.g., around the center of the three-dimensional object 112) to result in an apparent rotation of the three-dimensional space 106 about an axis extending straight upward from the ground plane 110 (e.g., extending vertically from the three-dimensional object 112).

To illustrate, in response to receiving a user interaction with an option to manipulate the yaw of the camera perspective, the camera perspective system changes the position and rotation of the camera perspective relative to the three-dimensional space to revolve (e.g., circumferentially travel) around the three-dimensional object 112 while maintaining the three-dimensional object 112 within the center of the view of the three-dimensional space 106 (e.g., within the center of viewing pane 114).

Furthermore, the camera perspective system receives a user interaction with an option to manipulate an altitude of the camera perspective. As used herein, an altitude of the camera perspective refers to a vertical position of the camera perspective relative to the three-dimensional space (e.g., three-dimensional space 106). For example, in response to receiving a user interaction with an option to manipulate the altitude of the camera perspective, the camera perspective system changes the position of the camera perspective along a vertical axis to change a vantage of the camera perspective relative to the three-dimensional space 106.

Additional detail regarding the options for manipulating the camera perspective is provided hereafter with reference to subsequent figures. In particular, additional detail regarding adjusting the pitch, roll, yaw, and/or altitude of the camera perspective is discussed in further detail below with reference to FIGS. 2-5.

Figure 2:
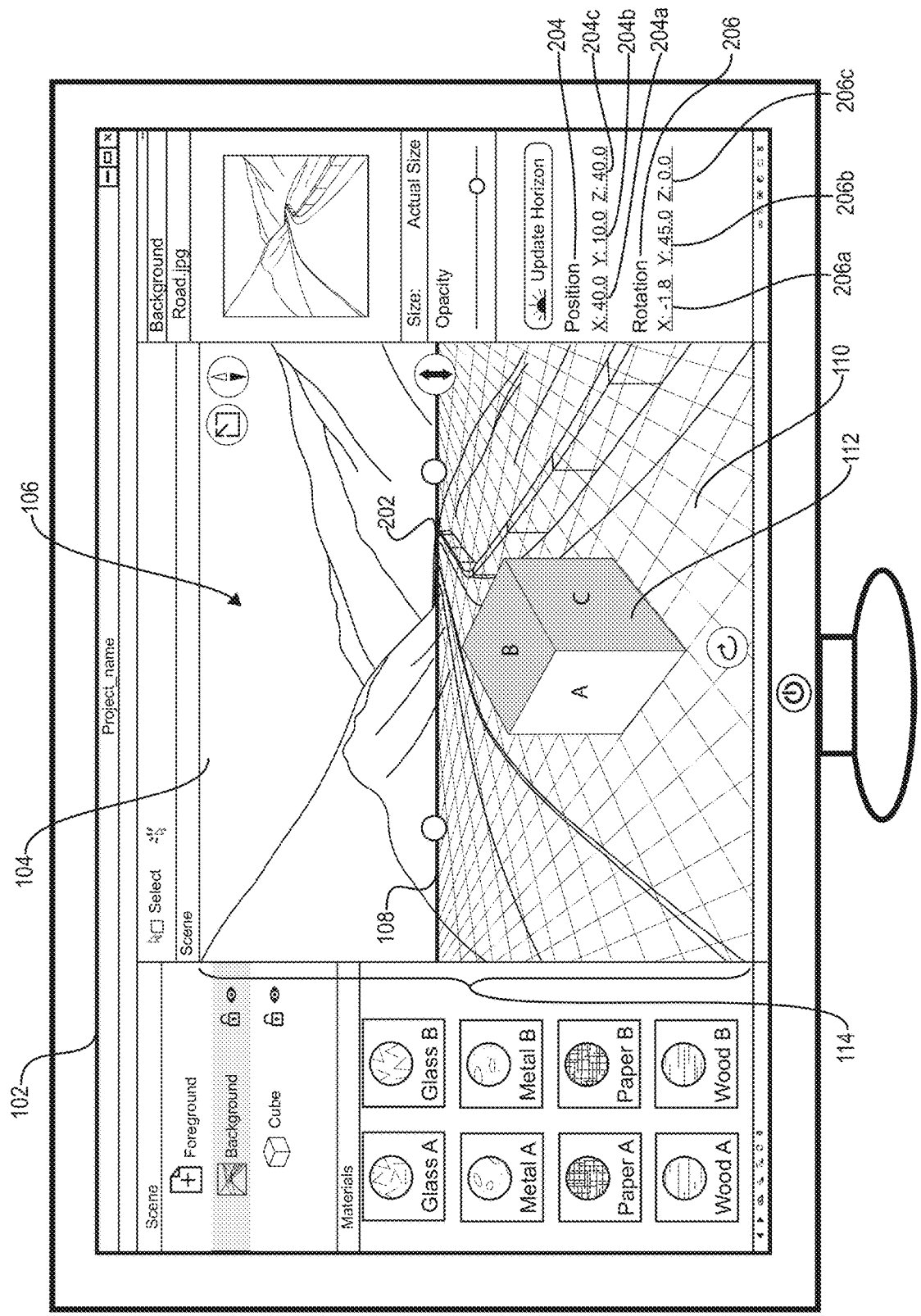
FIG. 2 illustrates an example user interface including an option for manipulating the pitch of the camera perspective in accordance with one or more embodiments.

FIG. 2 illustrates the computing device 100 including the user interface 102. In particular, the user interface 102 of FIG. 2 illustrates a pitch manipulation option 202 on the horizon 108. In at least one embodiment, the pitch manipulation option 202 is the selectable horizon 108—i.e., the transverse line that represents the horizon of the three-dimensional space 106. Additionally, the user interface 102 of FIG. 2 includes a positional coordinate 204 including a positional x-axis value 204a, a positional y-axis value 204b, and a positional z-axis value 204c. The user interface 102 further includes a rotational coordinate 206 including a rotational x-axis value 206a, a rotational y-axis value 206b, and a rotational z-axis value 206c.

As illustrated in FIG. 2, the horizon 108 of the three-dimensional space 106 is aligned with a desirable horizon of the background digital image 104. In particular, the horizon 108 is aligned with the point of the background digital image 104 where the road disappears from view. To align the horizon 108 of FIG. 1 with the background digital image 104 as shown in FIG. 2, the camera perspective system adjusts the pitch of the camera perspective with respect to the three-dimensional space 106.

For example, the camera perspective system receives a user interaction with pitch manipulation option 202. In particular, the camera perspective system receives a user selection of the pitch manipulation option 202 (e.g., the horizon 108). The camera perspective system further receives a user interaction (e.g., a click-and-drag interaction) with the pitch manipulation option 202 to change the pitch of the camera perspective. For example, the camera perspective system receives a user interaction with the pitch manipulation option 202 to drag the horizon 108 upward (or downward) within the two-dimensional view of the three-dimensional space 106. When the camera perspective system receives the input to drag the horizon 108 upward, the camera perspective system lowers the vertical angle of the camera perspective. In other words, the camera perspective system tilts the camera perspective in a downward direction which results in the horizon 108 moving upward within the view of the three-dimensional space 106 in accordance with the user interaction.

Generally, the camera perspective system tilts the pitch of the camera perspective in a direction opposite the direction of the user interaction with the pitch manipulation option 202. This is because the effect of tilting the camera perspective in one direction is an opposing change in position (e.g., position within the viewing pane 114) of the horizon 108, the ground plane 110, and/or the three-dimensional object 112. Elaborating on the previous example, the camera perspective system changes the pitch of the camera perspective by tilting the camera perspective downward, which results in the three-dimensional space 106 (e.g., including the horizon 108, the ground plane 110, and/or the three-dimensional object 112) moving upward within viewing pane 114 because the camera perspective is looking downward compared to its previous angle.

Accordingly, the camera perspective system changes the pitch of the camera perspective relative to the three-dimensional space 106 by adjusting a vertical angle of the camera perspective. Put another way, the camera perspective system tilts the camera perspective in a vertical direction (e.g., up or down). In at least one embodiment, the camera perspective system measures the angle of the camera perspective relative to an axis of the camera perspective. In other words, the camera perspective system assigns an angle of zero degrees or zero radians to a camera perspective that is pointed straight (e.g., substantially straight) ahead in world space, and then measures any change in pitch as a change relative to this baseline position. As used herein, "world space" refers to the three-dimensional space of the camera perspective, which is separate from the three-dimensional space 106. In particular, the world space includes a positional coordinate (e.g., positional coordinate 204) and a rotational coordinate (e.g., rotational coordinate 206) of the camera perspective as described in further detail below.

For example, when the camera perspective system tilts the pitch of the camera perspective upward, the change in angle relative to a horizontal camera perspective (e.g., a zero-degree baseline perspective where the camera perspective is looking straight ahead) is positive. Likewise, when the camera perspective system tilts the camera perspective downward, the change in angle relative to the horizontal camera perspective is negative. In at least one other embodiment, the camera perspective system measures the angle of the camera perspective relative to the horizon 108.

As illustrated in FIG. 2, the camera perspective system uses a positional coordinate 204 and a rotational coordinate 206. In particular, the user interface 102 includes a display of the positional coordinate 204 and the rotational coordinate 206. Generally, the camera perspective system determines (e.g., measures) the positional coordinate 204 based on a position of the camera perspective relative to an origin of the camera perspective within the world space, based on a three-dimensional Cartesian coordinate system. Likewise, the camera perspective system determines the rotational coordinate 206 based an orientation of the camera perspective relative to an origin, based on a three-dimensional polar coordinate system.

For example, as shown in FIG. 2, the positional coordinate 204 includes a positional x-axis value 204a, a positional y-axis value 204b, and a positional z-axis value 204c. The camera perspective system determines each of the positional axis values 204a -c within the world space that make up the positional coordinate 204 by measuring one or more axial distances from the origin (e.g., the position where each of the positional x-axis value 204a, the positional y-axis value 204b, and the positional z-axis value 204c are zero) of the camera perspective. In at least one embodiment, the x-axis refers to a horizontal axis perpendicular to the z-axis which, when considered together with the x-axis, defines an x-z plane within the world space. In these embodiments, the y-axis refers to a vertical axis that is perpendicular to the x-z plane (e.g., perpendicular to both the x-axis and the z-axis).

Accordingly, the camera perspective system determines a positional x-axis value 204a by measuring a distance of the camera perspective along the x-axis from the origin. Likewise, the camera perspective system determines a positional y-axis value 204b and a positional z-axis value 204c by measuring a distance of the camera perspective along the y-axis and the z-axis, respectively.

For example, as illustrated in FIG. 2, the camera perspective system positions the camera perspective with a given positional coordinate 204 having a positional x-axis value 204a of 40.0 units, a positional y-axis value 204b of 10.0 units, and a positional z-axis value 204c of 40.0 units. As used herein, a unit refers to a measure of distance such as, for example, a millimeter, a centimeter, an inch, a foot, a kilometer, a mile, etc. Though FIG. 2 depicts the x-axis, the y-axis, and the z-axis as defined above, in other embodiments, each of the axes may be defined differently (e.g., the x-axis, the y-axis, and the z-axis may refer to different dimensions/directions).

As further illustrated in FIG. 2, the camera perspective system determines a rotational coordinate 206 of the camera perspective. Generally, the rotational coordinate 206 refers to one or more angles (e.g., angles relative to respective axes) that define a direction to which the camera perspective is oriented. In particular, the camera perspective system determines a rotational coordinate 206 by measuring a rotational x-axis value 206a, a rotational y-axis value 206b, and a rotational z-axis value 206c. For example, the camera perspective system determines a rotational x-axis value 206a by measuring an angle between the direction of the camera perspective and the x-axis. Likewise, the camera perspective system determines a rotational y-axis value 206b and a rotational z-axis value 206c by measuring angles between the direction of the camera perspective and the y-axis and the z-axis, respectively. In this way, the camera perspective system determines a three-dimensional angle (e.g., a rotational coordinate 206) at which the camera perspective is oriented for a given instance.

To illustrate from FIG. 2, the camera perspective system determines a rotational coordinate 206 of the camera perspective as the camera perspective system changes the pitch of the camera perspective. As described above, adjusting the pitch changes a vertical angle of the camera perspective. Therefore, as the camera perspective system changes the pitch of the camera perspective in accordance with a user interaction with pitch manipulation option 202, the camera perspective system changes the rotational coordinate 206 accordingly.

For example, in at least one embodiment, the camera perspective system changes the rotational x-axis value 206a to tilt the camera perspective up or down with a pitch adjustment. In the same or other embodiments, the camera perspective system changes the rotational y-axis value 206b to tilt the camera perspective up or down in accordance with a pitch adjustment. In the same or other embodiments, the camera perspective system changes the rotational z-axis value 206c to tilt the camera perspective up or down according to a pitch adjustment. Additionally or alternatively, the camera perspective system changes one of the rotational x-axis value 206a, the rotational y-axis value 206b, and the rotational z-axis value 206c to tilt the camera perspective up or down according to pitch adjustment. In these or other embodiments, the camera perspective system maintains the positional coordinate 204 as the camera perspective system changes the rotational coordinate 206.

To elaborate, the camera perspective system performs one or more calculations to manipulate the pitch of the camera perspective in accordance with a user interaction with the pitch manipulation option 202. For reference, and for ease of understanding, the following mathematical definitions and notations are provided. As an example, to adjust the rotational coordinate 206, the camera perspective system creates a four-by-four (i.e., 4×4) affine transformation matrix R as given by:

$$\overline{R} = \text{axisAngle}(\overline{\text{axis}}, \theta)$$

where $\overline{\text{axis}}$ is a unit vector with components $\langle l, m, n \rangle$, and where $\theta$ is an angle specifying an amount of rotation around $\overline{\text{axis}}$. The camera perspective system creates matrix $\overline{R}$ with the following definition:

$$\begin{bmatrix} ll(1-\cos\theta)+\cos\theta & ml(1-\cos\theta)-n\sin\theta & nl(1-\cos\theta)+m\sin\theta & 0 \\ lm(1-\cos\theta)+n\sin\theta & mm(1-\cos\theta)+\cos\theta & nm(1-\cos\theta)-l\sin\theta & 0 \\ ln(1-\cos\theta)-m\sin\theta & mn(1-\cos\theta)+l\sin\theta & nn(1-\cos\theta)-\cos\theta & 0 \\ 0 & 0 & 0 & 1 \end{bmatrix}.$$

Generally, matrices are indexed by row first and then by column. Thus, for reference, R[0,2] retrieves the value in first row and the third column of matrix $\overline{R}$, $nl(1-\cos\theta)+m\sin\theta$. Vectors are generally defined as $\overline{v} = \langle x, y, z \rangle$, and individual vector components are accessed as $v_x$, $v_y$, and $v_z$. The dot product between two vectors a and b is expressed as $\overline{a} \cdot \overline{b}$ and the cross product of the same two vectors $\overline{a}$ and $\overline{b}$ is expressed as $\overline{a} \times \overline{b}$. The matrix product between two matrices $\overline{A}$ and $\overline{B}$ is expressed as $\overline{A} \times \overline{B}$. Each time the camera perspective system iteratively updates a matrix $\overline{C}$ (e.g., each time the camera perspective system calculates a change of positional coordinate 204 or rotational coordinate 206 in world space), the updated matrix is expressed with a "tick mark" or "prime" as $\overline{C'}$. Accordingly, for a given positional or rotational manipulation, the camera perspective system utilizes the matrix values corresponding to the matrix represented with the most tick marks (e.g., the matrix which the camera perspective system updates by the most iterations) because that matrix is inherently the most recently updated.

In particular, the camera perspective system performs the following pitch adjustment calculations as part of a pitch adjustment algorithm:

$$p = \text{atan2}(\delta mw_y, mw_z - c_{position_z})$$

where $\overline{mw}$ is a three-dimensional position of the mouse (e.g., finger, stylus, cursor, or other input indicator) at a current frame as projected onto a plane $\overline{P}_l$ (e.g., a three-dimensional interaction plane at a fixed distance in front of the camera perspective with a normal of $-\overline{c}_{forward}$ whereby the camera perspective system projects two-dimensional screen positions (e.g., two-dimensional positions within the viewing pane 114) onto a three-dimensional space (e.g., three-dimensional space 106) in world space, $\delta \overline{mw}$ is a three-dimensional change in a projected world space mouse position since the previous frame, and $c_{position}$ is a three-dimensional position of the camera perspective in world space;

$$\overline{P} = \text{axisAngle}(\langle 1,0,0 \rangle, p)$$

where p is defined above and the function axisAngle ( . . . ) is also defined above; and $$\overline{C'} = \overline{P} \times \overline{C}$$

where $\overline{C'}$ is defined by the rules above, $\overline{P}$ is defined above, and where $\overline{C}$ is a 4×4 affine transformation matrix specifying the position and orientation (e.g., the positional coordinate 204 and rotational coordinate 206, respectively) of the camera perspective in world space.

Thus, the camera perspective system calculates an angle of change between a previous camera perspective orientation and a current camera perspective orientation. In particular, the camera perspective system generates a transformation matrix to indicate a current positional coordinate 204 and rotational coordinate 206 in accordance with (e.g., proportional to) the user interaction with the pitch manipulation option 202.

Additional detail regarding changes in the positional coordinate 204 and/or the rotational coordinate 206 with respect to changes in roll, yaw, and/or altitude of the camera perspective is provided below with reference to FIGS. 3-5.

Figure 3:
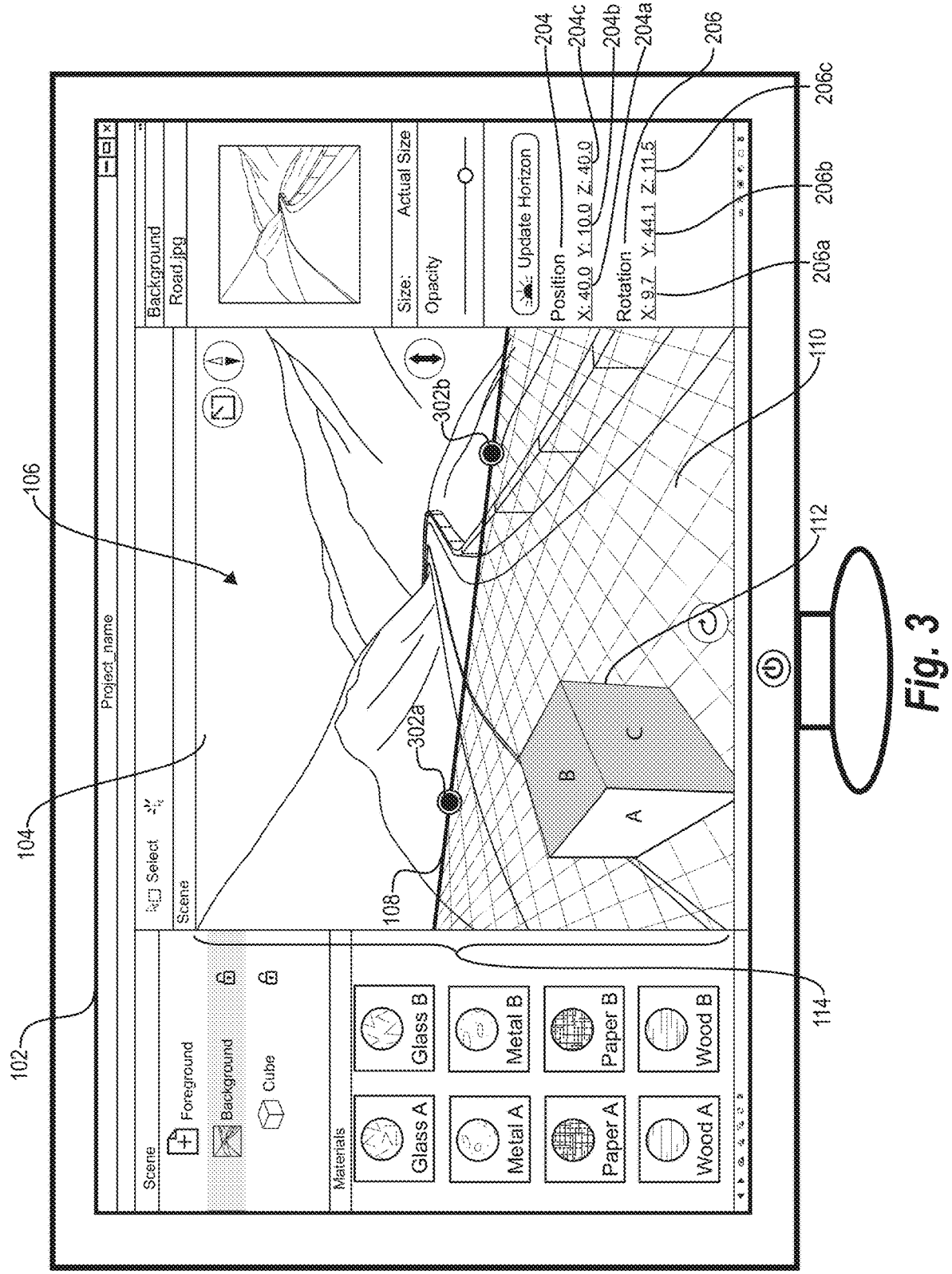
FIG. 3 illustrates an example user interface including an option for manipulating the roll of the camera perspective in accordance with one or more embodiments.

FIG. 3 illustrates the user interface 102 including the viewing pane 114. Within the viewing pane 114, FIG. 3 further illustrates a left roll manipulation option 302a and a right roll manipulation option 302b (referred to herein collectively as "roll manipulation option 302"). In particular, the camera perspective system receives a user interaction with the roll manipulation option 302 and, in accordance with the user interaction, manipulates the roll of the camera perspective.

For example, the camera perspective system manipulates the roll of the camera perspective by changing the rotational coordinate 206 (e.g., by adjusting one or more of the rotational x-axis value 206a, the rotational y-axis value 206b, and/or the rotational z-axis value 206c). Additionally, the camera perspective system maintains the positional coordinate 204 of the camera perspective as the camera perspective system changes the rotational coordinate 206. In at least one embodiment, the camera perspective system further changes the positional coordinate 204 (e.g., by adjusting one or more of the positional x-axis value 204a, the positional y-axis value 204b, and/or the positional z-axis value 204c) in addition, or alternatively, to changing the rotational coordinate 206. Furthermore, in order for the camera perspective system to manipulate the roll of the camera perspective in three dimensions by using a two-dimensional roll manipulation option 302, the camera perspective system manipulates both the roll of the camera perspective as well as the pitch of the camera perspective. Accordingly, by changing both the roll as well as the pitch, the camera perspective system maintains visual consistency by keeping whichever pivot point (e.g., a point at which the horizon line 108 intersects an edge of the viewing pane 114) is opposite the selected roll manipulation option 302 in place.

As illustrated in FIG. 3, the camera perspective system receives a user interaction with, for example, right roll manipulation option 302b. In response to, and in accordance with (e.g., proportionally to), the user interaction to drag the right roll manipulation option 302b downward within the viewing pane 114, the camera perspective system changes the rotational coordinate 206 of the camera perspective to roll/rotate the camera perspective. For example, the camera perspective system measures an amount of change (e.g., a distance moved) via the user interaction such as, for example, by tracking the movement of a mouse cursor, styles, finger, or other user input device.

To change the roll of the camera perspective in response to a user interaction with the right roll manipulation option 302b as shown in FIG. 3, the camera perspective system changes the rotational coordinate 206 to roll left to result in the view of the three-dimensional space 106 within viewing pane 114 depicting a right-sided rotation of the three-dimensional space 106 (e.g., including the horizon 108, the ground plane 110, and the three-dimensional object 112). Though the camera perspective system depicts a lean (e.g., a slope or angle) of the three-dimensional space 106 within viewing pane 114, the camera perspective system does not rotate the three-dimensional space 106, but instead rotates the camera perspective (and the background digital image 104 together with the camera perspective) relative to the three-dimensional space 106 for the illustrated effect in FIG. 3. The same is also true for pitch and yaw as well. That is to say, as the camera perspective system manipulates the camera perspective, the camera perspective system does not manipulate the three-dimensional space 106, but instead manipulates the camera perspective together with the background digital image 104 relative to the three-dimensional space 106.

In the same or other embodiments, the camera perspective system rolls (e.g., changes the rotational coordinate 206 of the camera perspective to roll/rotate) the camera perspective left to result in the view of the three-dimensional space 106 within viewing pane 114 depicting a right-sided rotation of the three-dimensional space 106.

In manipulating the roll of the camera perspective, the camera perspective system changes the rotational coordinate 206 as shown in FIG. 3. In particular, the camera perspective system adjusts a rotational x-axis value 206a, a rotational y-axis value 206b, and/or a rotational z-axis value 206c to cause the change in roll of the camera perspective as described above. Additional details regarding manipulating the roll of the camera perspective are provided hereafter.

To manipulate the roll of the camera perspective, the camera perspective system performs a roll manipulation algorithm. For reference, and for ease of understanding, definitions and rules are provided for performing a roll manipulation algorithm are provided hereafter. Additionally, the definitions and rules provided above with reference to FIG. 2 are also applicable to the roll manipulation algorithm discussed below with reference to FIG. 3. In particular, manipulating the roll of the camera perspective generally requires adjusting one or more of the positional coordinate 204 and the rotational coordinate 206. In at least one embodiment, the camera perspective system adjusts the rotational coordinate 206 in accordance with the rules and definitions provided above with reference to FIG. 2. As an example of adjusting the positional coordinate 204, the camera perspective system creates a 4×4 transformation matrix as given by:

$$\overline{T} = \text{translation}(\overline{v})$$

where the 4×4 affine transformation matrix $\overline{T}$ is defined as:

$$\begin{bmatrix} 1 & 0 & 0 & v_x \\ 0 & 1 & 0 & v_y \\ 0 & 0 & 1 & v_z \\ 0 & 0 & 0 & 1 \end{bmatrix}$$

where $\overline{v}$ is a vector with components $\langle v_x, v_y, v_z \rangle$ that represents an amount of movement (e.g., an amount of change/distance/translation in positional coordinate 204) along each of x-axis, the y-axis, and the z-axis, respectively.

To illustrate, the camera perspective manipulates the roll of the camera perspective in accordance with a user interaction with one or more of left roll manipulation option 302a or right roll manipulation option 302b by creating a rotation matrix $\overline{R}$ using the angles in the three-dimensional vector $\overline{\text{eulers}}$. In particular, the camera perspective system composes the rotation matrix $\overline{R}$ given by:

$$\overline{R} = \text{fromEulers}(\overline{\text{eulers}})$$

where the roll/rotation order (e.g., the order in which the camera perspective system calculates rotational x-axis value 206a, rotational y-axis value 206b, and rotational z-axis value 206c) is:

$$\overline{R}_y = \text{axisAngle}(\langle 0,1,0 \rangle, \text{eulers}_y)$$

$$\overline{R}_x = \text{axisAngle}(\langle 1,0,0 \rangle, \text{eulers}_x)$$

$$\overline{R}_z = \text{axisAngle}(\langle 0,0,1 \rangle, \text{eulers}_z)$$

$$\overline{R} = \overline{R}_y \times \overline{R}_x \times \overline{R}_z$$

and where $\overline{eulers}$ is defined by:

$$\overline{eulers} = toEulers(\overline{R})$$

such that, upon performing the function $toEulers(\overline{R})$, the camera perspective system extracts a vector $\overline{eulers}$ with components $\langle eulers_x, eulers_y, eulers_z \rangle$ from the affine transformation matrix $\overline{R}$ that represents a three-dimensional rotation. The three-dimensional rotation is designated by:

$$eulers_x = -asin(R[1,2])$$

Additionally, when $R[1,2]$ is close to 1 or $-1$, the camera perspective system computes $eulers_y$ and $eulers_z$ by:

$$eulers_y = atan\ 2\ (-R[2,0],\ R[0,0])$$

and $$euler_z = 0.$$

In at least one embodiment (e.g., other than when $R[1,2]$ is close to 1 or $-1$), the camera perspective system computes $eulers_y$ and $eulers_z$ by:

$$eulers_y = atan\ 2(R[0,2],\ R[2,2])$$

and $$eulers_z = atan\ 2(R[1,0],\ R[1,1]).$$

Using the above-described rules, the camera perspective system manipulates the roll of the camera perspective in world space by performing a roll manipulation algorithm including additional acts as described below. Accordingly, in at least one embodiment, the camera perspective system adjusts the roll of the camera perspective as described above by performing a roll manipulation algorithm including the following calculations:

$$y = toEulers(\overline{C})$$

to find a yaw Euler angle of the camera perspective in accordance with the rules regarding the $toEulers(\ldots)$ function as described above;

$$\overline{Y} = axisAngle(\langle 0,1,0 \rangle, y)$$

to extract a world space yaw rotation matrix in accordance with the $axisAngle(\ldots)$ function as described above;

$$\overline{C}'' = \overline{Y}^{-1} \times \overline{C}$$

to multiply the camera perspective transform matrix by the inverse yaw rotation matrix;

$$\overline{pivot_w} = \overline{hlw}\ or\ \overline{hrw}$$

to choose the roll pivot projected onto the three-dimensional world space plane $\overline{P_i}$, where $\overline{hlw}$ is the left horizon pivot position (e.g., the point at which the horizon 108 intersects the left edge of the viewing pane 114 within user interface 102), $\overline{hrw}$ is the right horizon pivot position (e.g., the point at which the horizon 108 intersects the left edge of the viewing pane 114 within user interface 102), $\overline{P_i}$ is a three-dimensional interaction plane at a fixed distance in front of the camera perspective with a normal of $-\overline{c_{forward}}$ whereby the camera perspective system projects two-dimensional screen positions (e.g., two-dimensional positions within the viewing pane 114) onto a three-dimensional space (e.g., three-dimensional space 106), and where the camera perspective system selects whichever of $\overline{hlw}$ or $\overline{hrw}$ is farthest from the mouse as the three-dimensional pivot point for the roll/rotation. The camera perspective system further performs the calculations:

$$\overline{axis} = \overline{pivot_w} - \overline{c_{position}}$$

where $\overline{c_{position}}$ is a vector from the camera perspective position, to find a vector from the camera perspective position to the three-dimensional pivot point;

$$\overline{h} = \overline{hrw} - \overline{hlw}$$

to calculate a horizon within the world space (e.g., a horizon in world space as defined by where the horizon 108 of the three-dimensional space 106 intersects either edge of the viewing pane 114), where $\overline{hlw}$ and $\overline{hrw}$ are defined above;

$$\overline{h_{new}} = \overline{mw} - \overline{pivot_w}$$

to construct a vector from the three-dimensional pivot point to the three-dimensional mouse cursor position $\overline{mw}$ on the plane $\overline{P_i}$ (e.g., the three-dimensional position of the mouse cursor, finger, stylus, or other user input device as the camera perspective provides via user interface 102 in accordance with user interaction with the roll manipulation option 302);

$$r = acos\left(\frac{\overline{h_{new}} \cdot \overline{h}}{|\overline{h_{new}}||\overline{h}|}\right)$$

to find the angle between the two vectors $\overline{h}$ and $\overline{h_{new}}$ using the dot product;

$$\overline{hrndf} = \overline{c_{forward}} \cdot (\overline{h_{new}} \times \overline{h})$$

to find the dot product between a normal of the horizon roll plane (e.g., the plane defined as the plane in which the camera perspective system is rolling/rotating the camera perspective) and a direction that the camera perspective is oriented, where $\overline{c_{forward}}$ is a three-dimensional vector indicating the forward-facing direction (e.g., orientation) of the camera perspective;

$$sign = \frac{\overline{hrndf}}{|\overline{hrndf}|}$$

to find the roll/rotation angle sign, whereby the camera perspective system determines a roll direction (e.g., where a positive sign designates a first direction and a negative sign designates a second direction);

$$\overline{R} = axisAngle(\overline{axis}, sign*r)$$

to create a rotation matrix with the pivot axis and the signed roll angle in accordance with the $axisAngle(\ldots)$ function as defined above, and where sign and r are further defined above;

$$\overline{C}''' = \overline{R} \times \overline{C}''$$

to roll/rotate the camera perspective; and $$\overline{C}''' = \overline{Y} \times \overline{C}'''$$

to restore the yaw of the camera perspective that was moved at the start of the roll manipulation algorithm above.

Figure 4:
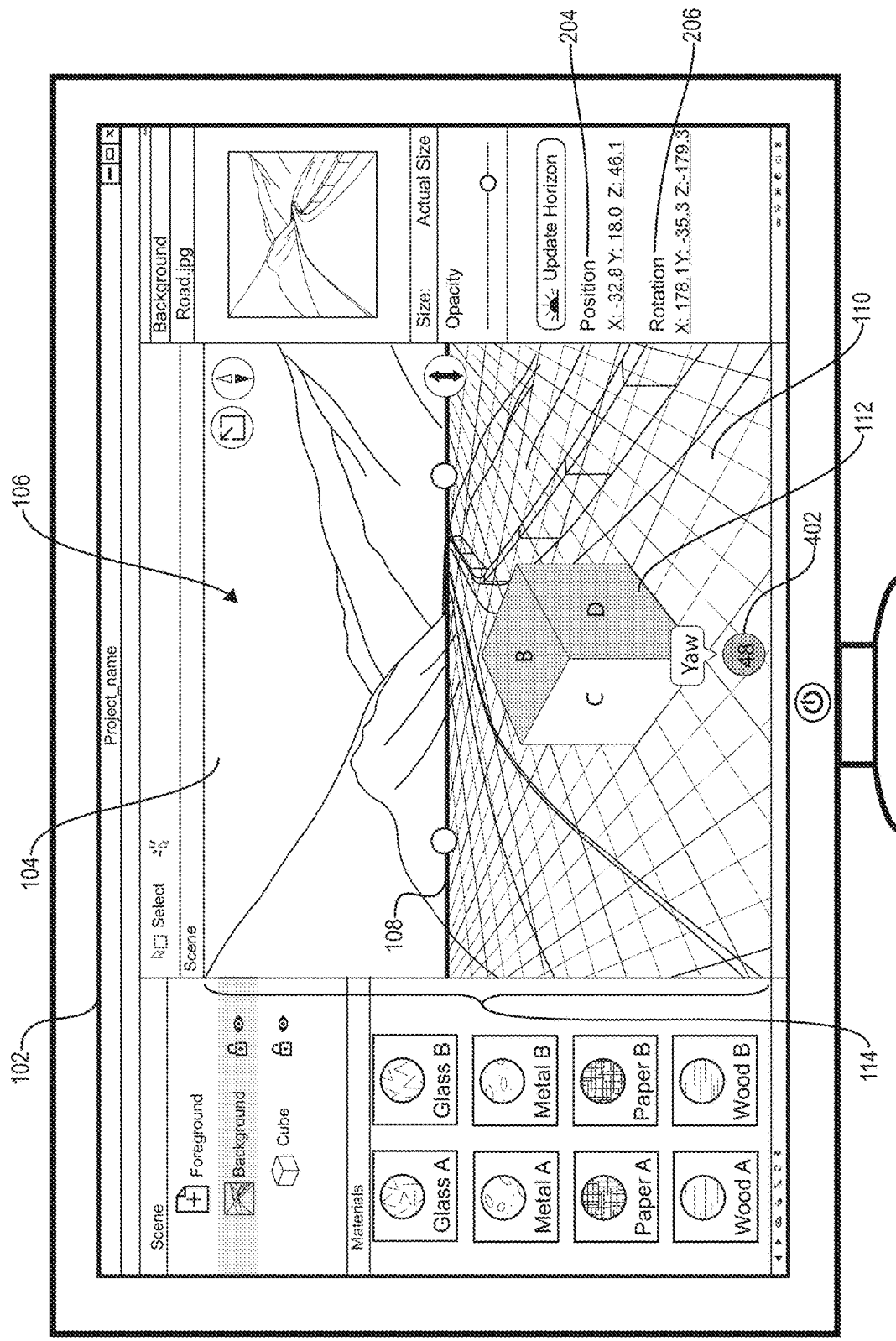
FIG. 4 illustrates an example user interface including an option for manipulating the yaw of the camera perspective in accordance with one or more embodiments.

FIG. 4 illustrates the user interface 102 including the viewing pane 114. Within viewing pane 114, FIG. 4 further illustrates a yaw manipulation option 402 within the user interface 102. In particular, the camera perspective system provides the yaw manipulation option 402 within the user interface 102. The camera perspective system receives user interaction with the yaw manipulation option 402 and manipulates the yaw of the camera perspective in accordance with (e.g., proportionally to) the user interaction.

For example, the camera perspective system measures a distance of movement of a mouse cursor, scroll wheel, finger, stylus, or other user input device and, based on the determined distance, changes the yaw of the camera perspective proportionally to the determine distance of movement of the user input device. To illustrate, the camera perspective system receives a user selection (e.g., a click, touch, tap, etc.) of the yaw manipulation option 402.

In at least one embodiment, the camera perspective system receives a sustained user interaction such as, for example, a click-and-hold interaction where the user maintains an input with a user input device (e.g., a depression of a button on a mouse, a touch on a touchscreen or touchpad, etc.). In these or other embodiments, the camera perspective system determines a distance of movement of the user input device only during the sustained user interaction (e.g., a click-and-drag interaction).

As illustrated in FIG. 4, the camera perspective system manipulates the yaw of the camera perspective to revolve the camera perspective around a point within the three-dimensional space 106. In particular, the camera perspective system changes the positional coordinate 204 and/or the rotational coordinate 206 to circumvolve the camera perspective around a point within the three-dimensional space. In at least one embodiment, the camera perspective system revolves the camera perspective around the three-dimensional object 112 (e.g., around a point on the ground plane 110 at the center of the three-dimensional object 112).

As described above, the camera perspective system revolves the camera perspective around the three-dimensional object 112 by adjusting the positional coordinate 204 such that the camera perspective travels in a circular path circumferentially around the three-dimensional object 112. In addition, the camera perspective system changes the rotational coordinate 206 simultaneously with the positional coordinate 204 to maintain the position of the three-dimensional object 112 within the view of the three-dimensional space (e.g., within the viewing pane 114).

In at least one embodiment, to revolve the camera perspective around a point within the three-dimensional space 106 (e.g., the point at the center of the three-dimensional object 112 that lies on the ground plane 110), the camera perspective system calculates a circular path have a given radius from the point (e.g., center of the three-dimensional object 112), where the radius refers to the distance from the point to the positional coordinate 204 of the camera perspective. Additional detail regarding an algorithm for manipulating the yaw of the camera perspective (e.g., by changing the positional coordinate 204 and/or the rotational coordinate 206) is provided hereafter.

As mentioned, the camera perspective system manipulates the yaw of the camera perspective according to a user interaction with yaw manipulation option 402. In particular, the camera perspective system manipulates the yaw of the camera perspective by performing a yaw manipulation algorithm including the following calculations:

$$y = \gamma * \delta ms_y$$

where $\gamma$ is the speed at which the camera perspective system changes the yaw of the camera perspective in accordance with the user interaction with the yaw manipulation option 402, and $\overline{\delta ms}$ is a two-dimensional change in the mouse cursor (or other user input device indicator) position since the previous frame;

$$\overline{Y} = \text{axisAngle}(\langle 0,1,0 \rangle, y)$$

where the function axisAngle ( . . . ) is defined above, and where y is also defined above; and $$\overline{C'} = \overline{Y} \times \overline{C}.$$

In at least one embodiment, the camera perspective system uses a default yaw control speed $\gamma=0.15$. In other embodiments, the camera perspective system receives a user input by way of a text field or other input field to define the yaw control speed. In still other embodiments, the camera perspective system determines a rate of change of the position of the mouse cursor or other user input indicator and uses the determined rate (or a proportional relationship thereto) as the yaw control speed $\gamma$.

To illustrate from FIG. 4, the camera perspective system revolves the camera perspective around the three-dimensional object 112 to reveal portions of the three-dimensional object 112 that were previously not visible. For example, comparing FIG. 4 to FIG. 2, sides A, B, and C of the three-dimensional object 112 are visible within viewing pane 114 of FIG. 2, whereas sides B, C, and D of the three-dimensional object 112 are visible within viewing pane 114 of FIG. 4. Thus, the camera perspective system changes the positional coordinate 204 and the rotational coordinate 206 to revolve the camera perspective around a point (e.g., at the center of the three-dimensional object) of the three-dimensional space 106, while still retaining a constant position of the three-dimensional object 112 within the three-dimensional space, as described above.

Figure 5:
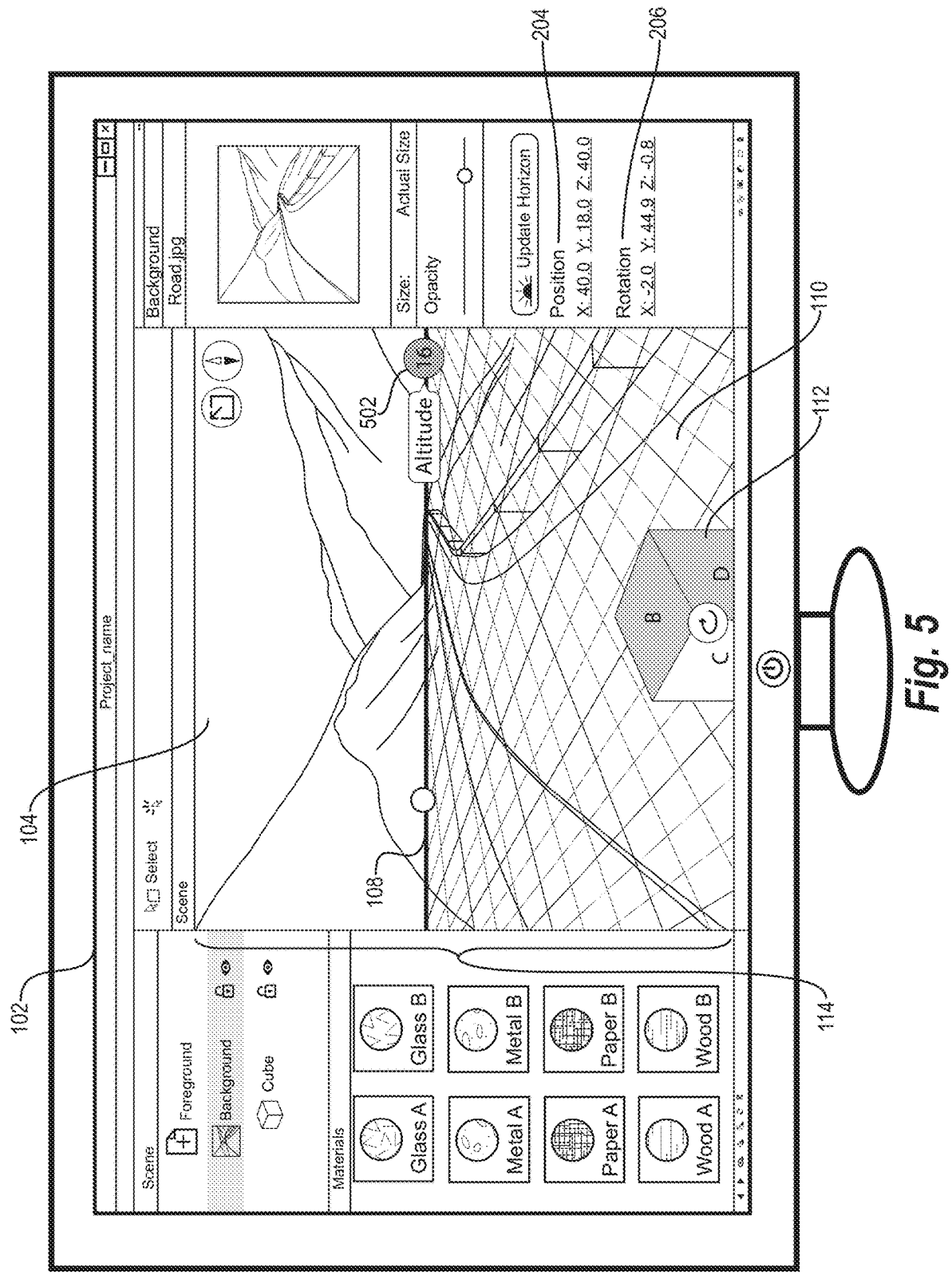
FIG. 5 illustrates an example user interface including an option for manipulating an altitude of the camera perspective in accordance with one or more embodiments.

FIG. 5 illustrates the user interface 102 including the viewing pane 114. Within the viewing pane 114 of FIG. 5, the camera perspective system provides an altitude manipulation option 502. In particular, the camera perspective system receives a user interaction with the altitude manipulation option 502. In response to receiving the user interaction with the altitude manipulation option 502, the camera perspective system manipulates the altitude of the camera perspective. For example, the camera perspective system changes the altitude of the camera perspective within the world space in accordance with (e.g., proportionally to) the user interaction with the altitude manipulation option 502.

For example, the camera perspective system receives a click-and-hold interaction by way of the altitude manipulation option 502. Additionally, the camera perspective system receives a scroll up or scroll down interaction during the click-and-hold interaction to decrease the altitude of the camera perspective or increase the altitude of the camera perspective, respectively. Particularly, the camera perspective system manipulates the altitude of the camera perspective in accordance with the scroll up or scroll down interaction.

In at least one embodiment, the camera perspective system receives a scroll down (or a drag down) interaction via the altitude manipulation option 502. In response to receiving the scroll down interaction, for example, the camera perspective system increases the altitude of the camera perspective. By increasing the altitude of the camera perspective, the camera perspective system changes the view of the three-dimensional space 106 within viewing pane 114 by effectively moving the ground plane 110 (and the three-dimensional object 112 resting on the ground plane 110) downward. Likewise, in response to receiving a scroll up interaction (or other interaction to effectively raise the ground plane 110 within the viewing pane 114), the camera perspective system decreases the altitude of the camera perspective to yield the effect within the viewing pane 114 of displaying a rise in the ground plane 110 and/or the three-dimensional object 112.

In manipulating the altitude of the camera perspective, the camera perspective system changes the positional coordinate 204 of the camera perspective. In particular, the camera perspective system adjusts the positional y-axis value 204*b* to raise or lower the altitude of the camera perspective. As discussed above, raising or lowering the camera perspective effectively results in the opposite change in the view of the three-dimensional space 106 within the viewing pane 114. In at least one embodiment, the camera perspective system adjusts one or more of the positional x-axis value 204a and the positional z-axis value 204c to manipulate the altitude of the camera perspective.

In manipulating the altitude of the camera perspective, the camera perspective system changes the view of the three-dimensional space 106, as discussed above. For example, in adjusting the altitude, the camera perspective system also adjusts the vertical position of the ground plane 110 and/or the three-dimensional object 112 within the two-dimensional viewing pane 114. However, in at least one embodiment, the horizon 108 of the three-dimensional space 106 remains in place—i.e., the camera perspective system does not change the vertical position of the horizon 108 within the viewing pane 114—while manipulating the altitude of the camera perspective.

In these or other embodiments, the camera perspective system refrains from changing the rotational coordinate 206 in manipulating the altitude of the camera perspective. In this way, the camera perspective system raises or lowers the camera perspective without changing an orientation (e.g., viewing angle) of the camera perspective. Thus, by manipulating the altitude of the camera perspective, the camera perspective system presents portions of the three-dimensional space 106 within the viewing pane 114 that are not visible at other altitudes (e.g., vertical positions). For example, by increasing the altitude (e.g., the positional y-axis value 204b) and thereby lowering the position of the ground plane 110 and/or the three-dimensional object 112 within the two-dimensional view of the three-dimensional space 106, the camera perspective system presents a view of a greater portion of the top of the three-dimensional object 112 (e.g., side B) and a lesser portion of the sides of the three-dimensional object 112 (e.g., sides C and D) than are visible from a straight-on vantage.

Additional detail regarding manipulating the altitude of the camera perspective is provided hereafter. In particular, the camera perspective system manipulates the altitude of the camera perspective according to a user interaction with the altitude manipulation option 502 by performing an altitude manipulation algorithm. In particular, the camera perspective system manipulates the altitude of the camera perspective by performing an altitude manipulation algorithm including the following calculations:

$$\alpha = -\alpha * \delta ms_y$$

where $\alpha$ is the speed of the altitude control and $\overline{\delta ms}$ is a two-dimensional change in the mouse cursor (or other user input indicator) position since the previous frame (e.g., since the previous frame corresponding to the refresh rate of the display of computing device 100). Based on the time interval between frames (e.g., the refresh rate) of the computing device 100, and further based on a change or distance moved of the mouse cursor position between frames, the camera perspective system determines a speed of the altitude control. The camera perspective system further performs the following calculations:

$$\overline{A} = \text{translation}(\langle 0, \alpha, 0 \rangle)$$

where the function translation( . . . ) is defined above; and $$\overline{C'} = \overline{A} \times \overline{C}.$$

In at least one embodiment, the camera perspective system uses a default altitude control speed $\alpha = 0.05$. In other embodiments, the camera perspective system receives a user input by way of a text field or other input field to define the altitude control speed. In still other embodiments, the camera perspective system determines a rate of change of the position of the mouse cursor or other user input indicator and uses the determined rate (or a proportional relationship thereto) as the altitude control speed $\alpha$.

Figure 6:
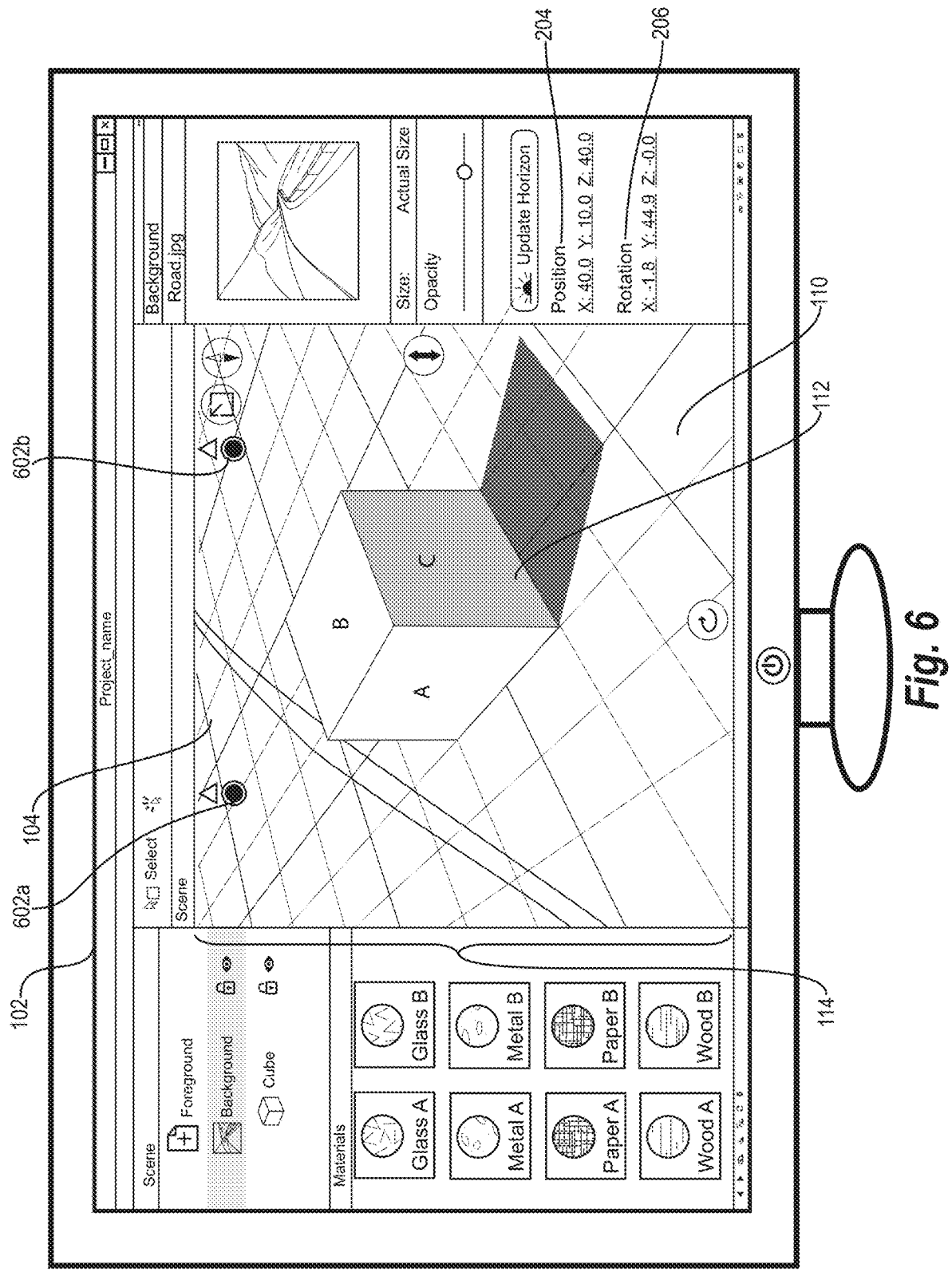
FIG. 6 illustrates an example user interface including an off-screen option for manipulating the camera perspective in accordance with one or more embodiments.

FIG. 6 illustrates the viewing pane 114 including off-screen left roll manipulation option 602a and off-screen right roll manipulation option 602b (referred to collectively herein as "off-screen roll manipulation option 602"). In particular, the camera perspective system detects that the view of the three-dimensional space 106 is too close or is otherwise positioned such that the horizon 108 does not fit within viewing pane 114. In other words, the positional coordinate 204 of the camera perspective is such that the view of the three-dimensional space 106 does not include the horizon 108.

Accordingly, the camera perspective system provides, by way of user interface 102, an off-screen roll manipulation option 602 as shown in FIG. 6. The camera perspective system provides the off-screen roll manipulation option 602 to facilitate camera perspective manipulations even at camera perspective positions or zoom depths where the horizon 108 is not visible within the view of the three-dimensional space 106. Thus, the camera perspective system receives user interaction with the off-screen roll manipulation option 602 like the camera perspective receives user interaction with roll manipulation option 302 as described above.

Although FIG. 6 illustrates an off-screen roll manipulation option 602, in at least one embodiment, the camera perspective system provides, by way of the user interface 102, an off-screen pitch manipulation option. In particular, the camera perspective system detects when the horizon 108 is out of the view of the three-dimensional space 106 and, in response, provides an off-screen pitch manipulation option. Additionally, the camera perspective system receives a user interaction with the off-screen pitch manipulation option as described above with regard to the pitch manipulation option 202 of FIG. 2.

In the same or other embodiments, the camera perspective system provides an off-screen yaw manipulation option and/or an off-screen altitude manipulation option. Though FIG. 6 depicts the yaw manipulation option and the altitude manipulation option fixed in place within the user interface 102, in at least one embodiment, the camera perspective system provides the yaw manipulation option and the altitude manipulation option in different locations or else provides off-screen options as described above.

Figure 7:
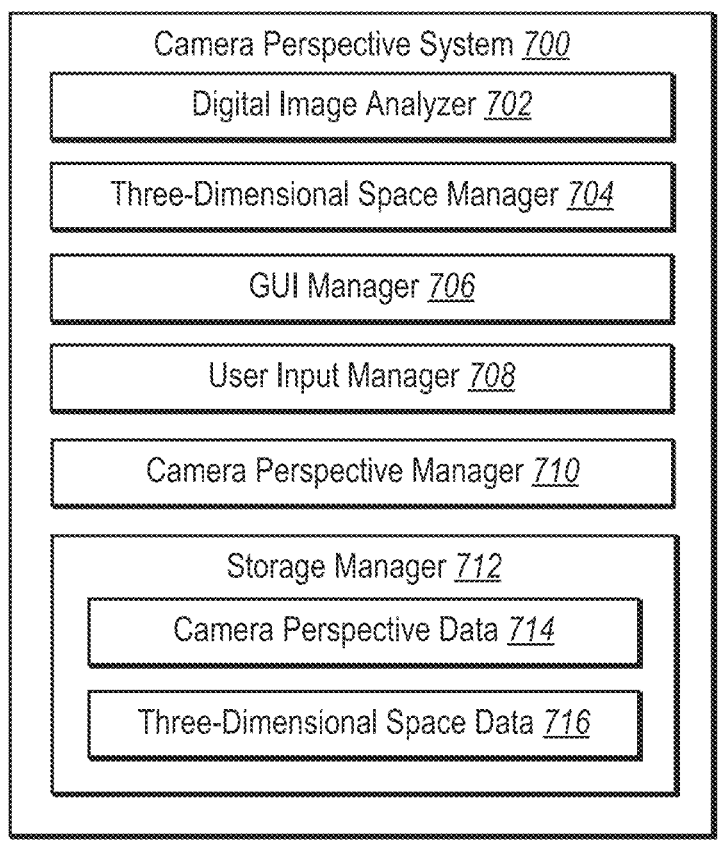
FIG. 7 illustrates a schematic diagram of a camera perspective system in accordance with one or more embodiments.
Figure 8:
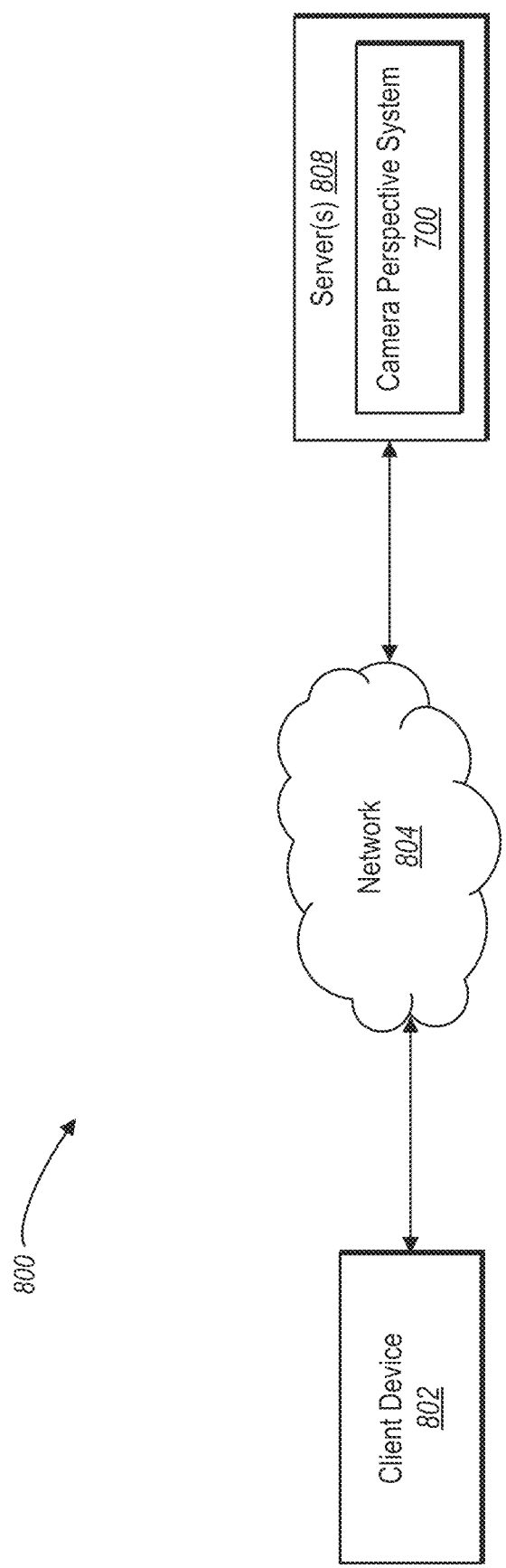
FIG. 8 illustrates an example environment in which the camera perspective system operates in accordance with one or more embodiments.

Looking now to FIG. 7, additional detail is provided regarding components and capabilities of one embodiment of the camera perspective system. In particular, FIG. 8 illustrates an embodiment of an exemplary camera perspective system 700 (e.g., the camera perspective system referenced and described above). As shown, the camera perspective system 700 may include, but is not limited to, a digital image analyzer 702, a three-dimensional space manager 704, a graphical user interface ("GUI") manager 706, a user input manager 708, a camera perspective manager 710 and a storage manager 712.

Although FIG. 7 depicts the camera perspective system 700 including a specific number of parts, elements, and/or components, in at least one other embodiment, the camera perspective system 700 can include more or fewer elements or components. For example, one or more of the components 702-712 as shown in FIG. 7 can be divided or combined in one or more embodiments.

As shown in FIG. 7, the camera perspective system 700 includes a digital image analyzer 702. In particular, the digital image analyzer 702 analyzes a digital image such as background digital image 104. In at least one embodiment, the digital image analyzer 702 identifies a horizon of a background digital image. Additionally, the digital image analyzer 702 communicates with the three-dimensional space manager 704 to generate a three-dimensional space (e.g., three-dimensional space 106) as an overlay against the background digital image.

In addition, the camera perspective system 700 includes a three-dimensional space manager 704. In particular, the three-dimensional space manager 704 creates and/or manages a three-dimensional space (e.g., three-dimensional space 106). For example, the three-dimensional space manager 704 generates a three-dimensional space against a background digital image. Additionally, the three-dimensional space manager 704 creates, within a three-dimensional space, a horizon (e.g., horizon 108) and/or a three-dimensional object (e.g., three-dimensional object 112).

The three-dimensional space manager 704 communicates with GUI manager 706 and camera perspective manager 710 to present views of the three-dimensional space according to camera perspective changes. In particular, the camera perspective manager 710 manipulates the camera perspective by changing one or more of a pitch, roll, yaw, and/or altitude of the camera perspective. In conjunction with the camera perspective manager 710 manipulating the camera perspective in response to user interaction with one or more options for manipulating the camera perspective, the camera perspective manager 710 communicates with the three-dimensional space manager 704 to change the view of the three-dimensional space accordingly. Particularly, the camera perspective manager 710 changes a camera perspective to reveal portions of the three-dimensional space that are not visible from a different vantage or camera perspective position/orientation.

Furthermore, the GUI manager 706 communicates with the three-dimensional space manager 704 and/or the camera perspective manager 710 to present a user interface (e.g., user interface 102) including a viewing pane (e.g., viewing pane 114) and options for manipulating the camera perspective. In particular, the GUI manager 706 provides, by way of a display (e.g., a display on computing device 100), a viewing pane within a user interface that presents a view of the three-dimensional space. The GUI manager 706 displays the three-dimensional space (and changes thereto) in accordance with changes to the camera perspective, revealing portions of the three-dimensional space that are visible from the current camera perspective.

The camera perspective system 700 further includes a user input manager 708. In particular, the user input manager 708 receives a user interaction with one or more options for manipulating the camera perspective. The user input manager 708 communicates with one or more other components such as the camera perspective manager 710 and/or the three-dimensional space manager 704 to change the camera perspective and/or the view of the three-dimensional space in accordance with received user interaction.

In addition, the camera perspective system 700 includes a storage manager 712. As part of the storage manager 712, the camera perspective system 700 further includes camera perspective data 714 and three-dimensional space data 716. The storage manager 712 communicates with one or more other components of the camera perspective system 700 such as, for example, the three-dimensional space manager 704 and/or the camera perspective manager 710. To illustrate, the storage manager 712 communicates with the camera perspective manager to perform a camera perspective manipulation algorithm (e.g., a pitch manipulation algorithm, a roll manipulation algorithm, a yaw manipulation algorithm, and/or an altitude manipulation algorithm).

Particularly, the storage manager 712 provides and/or collects camera perspective data 714 as well as three-dimensional space data 716 to perform a camera perspective manipulation algorithm. For example, to change a rotational coordinate and/or a positional coordinate of the camera perspective, the three-dimensional space manager 704 and the camera perspective manager 710 perform various calculations, as described above. To perform the calculations, the storage manager 712 stores camera perspective data 714 for the camera perspective manager 710. Likewise, the storage manager 712 stores three-dimensional space data 716 for the three-dimensional space manager 704.

FIG. 8 illustrates a schematic diagram of one embodiment of an exemplary environment 800 in which the camera perspective system (e.g., the camera perspective system 700) operates. In one or more embodiments, the exemplary environment 800 includes a client device 802, a network 804, and one or more server(s) 808 housing the camera perspective system 700.

As illustrated in FIG. 8, the environment 800 may include a client device 802. In particular, the client device 802 can communicate, via network 804, with the server(s) 808 housing the camera perspective system 700. Alternatively, the client device 802 can house the camera perspective system 700. Accordingly, the client device 802 can communicate with the server(s) 808 to request permission or access to use the camera perspective system 700 (e.g., in embodiments where the camera perspective system 700 provides a subscription-based service).

As also illustrated in FIG. 8, the environment 800 may further include a network 804. In particular, the network 804 can interface the client device 802 with the server(s) 808. Accordingly, the network 804 can facilitate communications between the client device 802 and the server(s) 808 via appropriate network protocol.

Although FIG. 8 illustrates a particular arrangement of the environment 800, including the client device 802, the network 804, and the one or more server(s) 808, various additional or alternative arrangements are possible. For example, while FIG. 8 illustrates a single client device 802 in communication with a network 804 and the server(s) 808, in one or more embodiments multiple client devices may communicate directly with the server(s) 808, bypassing network 804.

In another example, in one or more embodiments, the environment 800 does not include server(s) 808. Instead, the client device 802 may house the camera perspective system. Thus, the camera perspective system may initiate a camera perspective manipulation process as described above. Therefore, the client device 802 and/or the server(s) 808 can generate a three-dimensional space overlaid against a background digital image and further perform the camera perspective manipulations described in detail above.

Figure 9:
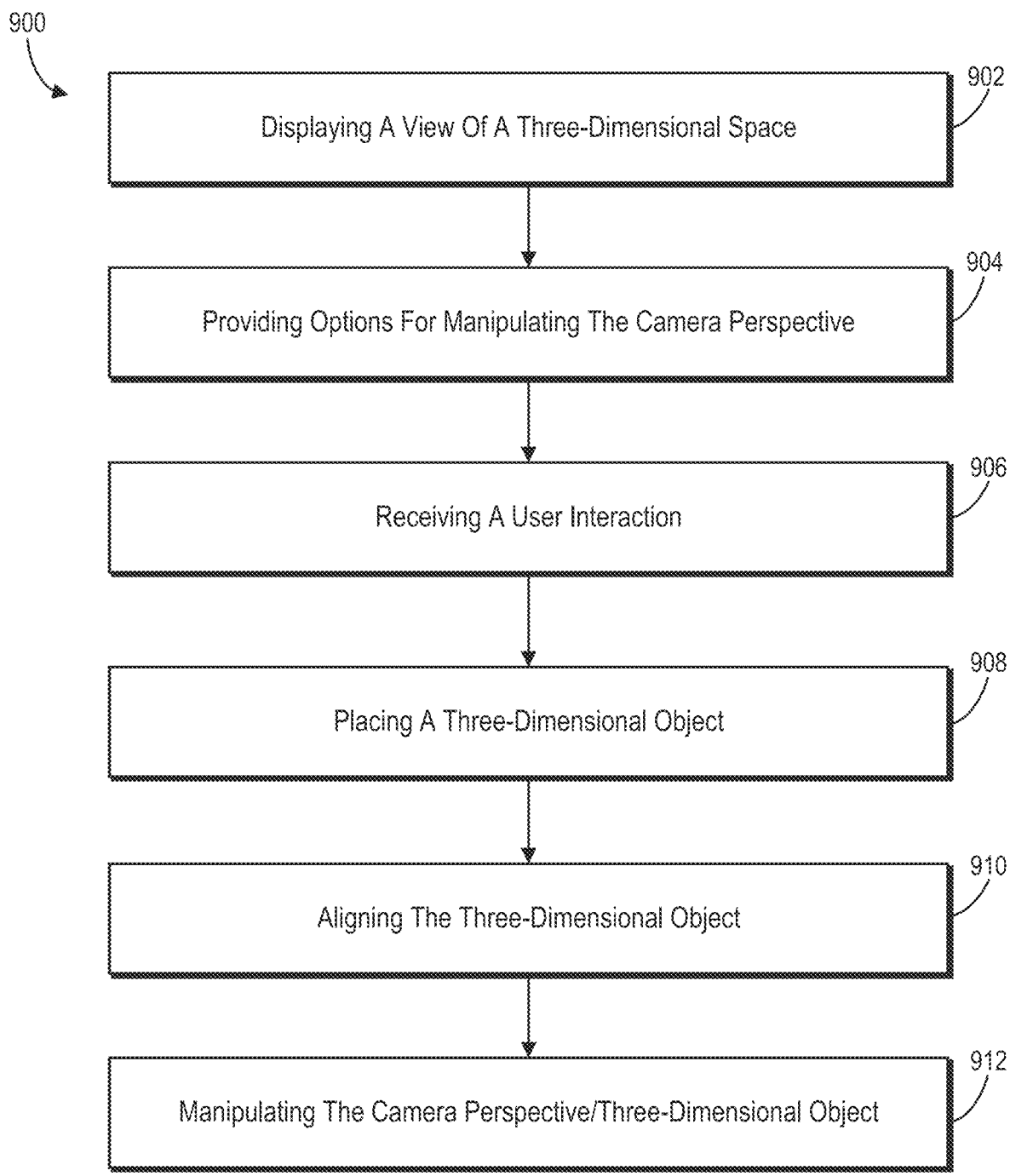
FIG. 9 illustrates a flowchart of a series of acts in a method for manipulating a camera perspective in accordance with one or more embodiments.

FIGS. 1-8, the corresponding text, and the examples provide a number of different systems and methods that manipulate a camera perspective. In addition to the foregoing, embodiments can also be described in terms of flowcharts comprising acts and/or steps in a method for accomplishing a particular result. For example, FIG. 9 illustrates a flowchart of an exemplary method in accordance with one or more embodiments. The method described in relation to FIG. 9 may be performed with fewer or more steps/acts or the steps/acts may be performed in any number of different orders or sequences. Additionally, the steps/acts described herein may be repeated or performed in parallel with one another or in parallel with different instances of the same or other similar steps/acts.

FIG. 9 illustrates a flowchart of a series of acts in a method 900 of manipulating a camera perspective. In one or more embodiments, the method 900 is performed in a digital medium environment for rendering a three-dimensional object against a background digital image. The method 900 is intended to be illustrative of one or more methods in accordance with the present disclosure, and is not intended to limit potential embodiments. Alternative embodiments can include additional, fewer, or different steps than those articulated herein with respect to FIG. 9.

As illustrated in FIG. 9, the method 900 includes an act 902 of displaying a view of a three-dimensional space. In particular, the act 902 can include displaying, overlaid against a background digital image, a view of a three-dimensional space in accordance with a camera perspective of the three-dimensional space, the three-dimensional space including a horizon, a ground plane extending from the horizon, and a three-dimensional object, the view of the three-dimensional space including portions of the horizon, the ground plane, and the three-dimensional object that are visible from the camera perspective.

The method 900 may additionally or alternatively include an act of placing a three-dimensional object as an overlay of a background digital image. In addition, the method 900 may include an act of aligning the three-dimensional object with the background digital image in accordance with a view of a three-dimensional space based on a camera perspective of the three-dimensional space, the three-dimensional space comprising the three-dimensional object, a horizon, and a ground plane extending from the horizon. Aligning the three-dimensional object with the background digital image may involve analyzing the background digital image to identify a horizon within the background digital image, and manipulating the camera perspective of the three-dimensional space to align the three-dimensional object, the horizon, and the ground plane extending from the horizon of the three-dimensional space with the identified horizon of the background digital image.

The method 900 further includes an act 904 of providing options for manipulating the camera perspective. In particular, the act 904 can include providing, to a user by way of the user interface, a plurality of options for manipulating the camera perspective of the three-dimensional space to adjust the view of the three-dimensional space overlaid against the background image.

For example, the act 904 can involve providing an option for manipulating a pitch of the camera perspective. Additionally, the user interaction can include an interaction with the option for manipulating the pitch of the camera perspective. The act 904 can involve providing an option for manipulating a roll of the camera perspective. The user interaction can also include an interaction with the option for manipulating the roll of the camera perspective.

Additionally or alternatively, the act 904 can involve providing an option for manipulating a yaw of the camera perspective. The user interaction can also include an interaction with the option for manipulating the yaw of the camera perspective. The act 904 can also include providing an option for manipulating an altitude of the camera perspective. The user interaction can include an interaction with the option for manipulating the altitude of the camera perspective.

As shown in FIG. 9, the method 900 further includes an act 906 of receiving a user interaction. In particular, the act 906 can include receiving a user interaction with one of the plurality of options for manipulating the camera perspective of the three-dimensional space.

Additionally or alternatively, the method 900 includes an act 908 of placing a three-dimensional object. In particular, the act 908 can involve placing a three-dimensional object as an overlay of a background digital image. For example, the three-dimensional object may be connected to the ground plane as part of the three-dimensional space, or may be separate from the three-dimensional space.

Further, the method 900 may include an act 910 of aligning the three-dimensional object. In particular, the act 910 can involve aligning the three-dimensional object with the background digital image in accordance with a view of a three-dimensional space based on a camera perspective of the three-dimensional space, the three-dimensional space comprising the three-dimensional object, a horizon, and a ground plane extending from the horizon. In addition, aligning the three-dimensional object with the background digital image may include analyzing the background digital image to identify a horizon within the background digital image; and manipulating the camera perspective of the three-dimensional space to align the three-dimensional object, the horizon, and the ground plane extending from the horizon of the three-dimensional space with the identified horizon of the background digital image.

The method 900 additionally includes an act 912 of manipulating the camera perspective. In particular, the act 912 can include manipulating, in response to and in accordance with the user interaction, the camera perspective of the three-dimensional space to adjust the view of the three-dimensional space relative to at least one of the horizon, the ground plane, or the three-dimensional object of the three-dimensional space. For example, the act 912 can involve changing at least one of a positional coordinate of the camera perspective or a rotational coordinate of the camera perspective. Alternatively, the method 900 includes an act 912 of manipulating the three-dimensional object. In particular, the act 912 may involve a step for manipulating the three-dimensional object relative to the background digital image by adjusting the camera perspective relative to the three-dimensional space. For example, the step for manipulating the three-dimensional object is described above with respect to the above equations.

The act 912 can involve changing the pitch of the camera perspective. In particular, changing the pitch of the camera perspective can include changing a rotational coordinate of the camera perspective to change a vertical position of the horizon, the ground plane, and the three-dimensional object within the view of the camera perspective, as well as maintaining the positional coordinate of the camera perspective.

The act 912 can also involve changing the roll of the camera perspective. In particular, changing the roll of the camera perspective can include changing the rotational coordinate of the camera perspective to rotate the horizon, the ground plane, and the three-dimensional object within the view of the camera perspective, and maintaining the positional coordinate of the camera perspective. Additionally, changing the rotational coordinate of the camera perspective to rotate the horizon, the ground plane, and the three-dimensional object within the view of the camera perspective can include pivoting the camera perspective about a point where the horizon meets an edge of the user interface.

Additionally or alternatively, the act 912 can involve changing the yaw of the camera perspective. Changing the yaw of the camera perspective can include changing the positional coordinate and the rotational coordinate of the camera perspective to revolve the camera perspective about the y-axis around the three-dimensional object to maintain both a vertical position and a horizontal position of the horizon, the ground plane, and the three-dimensional object within the view of the camera perspective and to change an orientation of the ground plane and the three-dimensional object within the view of the camera perspective as the camera perspective revolves around the three-dimensional object.

Additionally, changing the positional coordinate can include changing the positional x-axis value and the positional z-axis value to revolve the camera perspective about the y-axis around the three-dimensional object, and maintaining the positional y-axis value to maintain the vertical position of horizon, the ground plane, and the three-dimensional object. Changing the rotational coordinate can include changing the rotational x-axis value, the rotational y-axis value, and the rotational z-axis value to, as the camera perspective revolves around the three-dimensional object, maintain both the vertical position and the horizontal position of the horizon, the ground plane, and the three-dimensional object within the view of the camera perspective and to change the orientation of the ground plane and the three-dimensional object within the view of the camera perspective, thereby changing a viewable portion of the three-dimensional object.

The act 912 can further involve changing the altitude of the camera perspective. In particular, changing the altitude of the camera perspective can include changing the positional coordinate of the camera perspective by changing the positional y-axis value to move the ground plane and the three-dimensional object in a vertical direction within the view of the camera perspective and to maintain a vertical position of the horizon within the view of the camera perspective, thereby changing a viewable portion of the three-dimensional object, and maintaining the rotational coordinate of the camera perspective.

The positional coordinate can include a positional x-axis value, a positional y-axis value, and a positional z-axis value. In particular, the positional x-axis value can include a first Cartesian coordinate value defining a position relative to an x-axis, wherein the x-axis is a horizontal axis (e.g., an abscissa). Additionally, the positional y-axis value can include a second Cartesian coordinate value defining a position relative to a y-axis, wherein the y-axis is a vertical axis perpendicular to the x-axis (e.g., an ordinate). Furthermore, the positional z-axis value can include a third Cartesian coordinate value defining a position relative to a z-axis, wherein the z-axis is perpendicular to both the x-axis and the y-axis (e.g., an applicate).

Likewise, the rotational coordinate can include a rotational x-axis value, a rotational y-axis value, and a rotational z-axis value. In particular, the rotational x-axis value can include a first number of radians defining a first angle along a direction of the x-axis. Additionally, the rotational y-axis value can include a second number of radians defining a second angle along a direction of the y-axis. Furthermore, the rotational z-axis value can include a third number of radians defining a third angle along a direction of the z-axis.

The method 900 can further include an act of detecting that the horizon of the three-dimensional space is outside of a viewing pane of the user interface, as well as an act of providing, in response to detecting that the horizon is outside of the viewing pane, an indication that the horizon is outside of the viewing pane of the user interface. Additionally, the method 900 can include an act of providing, by way of the user interface and in further response to detecting that the horizon is outside of the viewing pane, one or more off-screen options for manipulating the camera perspective relative to the three-dimensional space.

The method 900 can additionally or alternatively include a step for manipulating the three-dimensional object relative to the background digital image by adjusting the camera perspective relative to the three-dimensional space.. The step for manipulating the three-dimensional object can include enabling one or more options for adjusting the camera perspective of the three-dimensional space and utilizing one or more camera perspective adjustment algorithms corresponding to the one or more options for adjusting the camera perspective of the three-dimensional space, as described herein.

In at least one embodiment, the three-dimensional object is connected to the ground plane, and adjusting the camera perspective relative to the three-dimensional space including adjusting the view relative to the three-dimensional object. Additionally, the method 900 can include an act of analyzing the background digital image to identify a horizon within the background digital image. The method 900 can further include an act of manipulating the camera perspective of the three-dimensional space to align the horizon within the view of the three-dimensional space with the identified horizon of the background digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
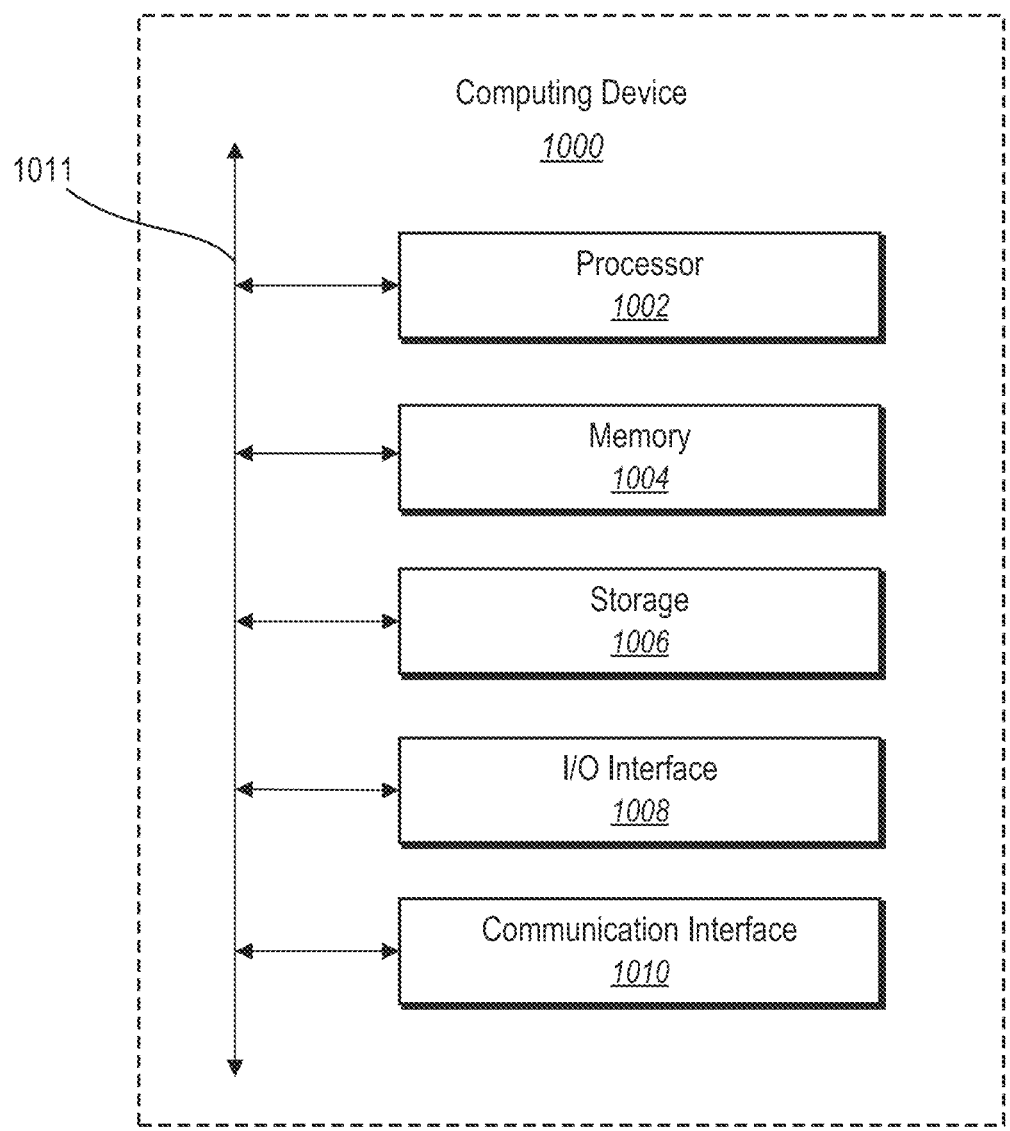
FIG. 10 illustrates a block diagram of an example computing device in accordance with one or more embodiments.

FIG. 10 illustrates, in block diagram form, an exemplary computing device 1000 that may be configured to perform one or more of the processes described above. One will appreciate that the camera perspective system 700 can comprise implementations of the computing device 1000. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1011. The bus 1011 can comprise hardware, software, or both that couples components of computing device 1000 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for rendering a three-dimensional object against a background comprising a digital image, a computer-implemented method of manipulating a camera perspective relative to a three-dimensional space comprising the three-dimensional object, the method comprising:
   analyzing, by a processor of a camera perspective system, a background digital image to identify traits of the background digital image;
   determining, by the processor of the camera perspective system and based on the traits of the background digital image, an alignment for rendering a horizon relative to the background digital image;
   displaying, overlaid against the background digital image, a viewable portion of a three-dimensional space that is visible from a camera perspective of the three-dimensional space, the three-dimensional space extending beyond the viewable portion and comprising the horizon spanning the three-dimensional space and positioned according to the alignment relative to the background digital image, a ground plane extending from the horizon, and a three-dimensional object positioned relative to the ground plane;
   providing, to a user by way of a user interface, a plurality of options for manipulating the camera perspective of the three-dimensional space to adjust the viewable portion of the three-dimensional space overlaid against the background digital image;
   receiving a user interaction with one of the plurality of options for manipulating the camera perspective of the three-dimensional space; and
   manipulating, in response to and in accordance with the user interaction, the camera perspective of the three-dimensional space to adjust the viewable portion of the three-dimensional space relative to the horizon, the ground plane, and the three-dimensional object of the three-dimensional space.

2. The computer-implemented method of claim 1, wherein manipulating the camera perspective relative to the three-dimensional space comprises changing at least one of a positional coordinate of the camera perspective or a rotational coordinate of the camera perspective.

3. The computer-implemented method of claim 2, wherein:
   the positional coordinate comprises a positional x-axis value, a positional y-axis value, and a positional z-axis value; and
   the rotational coordinate comprises a rotational x-axis value, a rotational y-axis value, and a rotational z-axis value.

4. The computer-implemented method of claim 3, wherein:
   the positional x-axis value comprises a first Cartesian coordinate value defining a position relative to an x-axis, wherein the x-axis is a horizontal axis;
   the positional y-axis value comprises a second Cartesian coordinate value defining a position relative to a y-axis, wherein the y-axis is a vertical axis perpendicular to the x-axis;
   the positional z-axis value comprises a third Cartesian coordinate value defining a position relative to a z-axis, wherein the z-axis is perpendicular to both the x-axis and the y-axis;
   the rotational x-axis value comprises a first number of radians defining a first angle along a direction of the x-axis;
   the rotational y-axis value comprises a second number of radians defining a second angle along a direction of the y-axis; and
   the rotational z-axis value comprises a third number of radians defining a third angle along a direction of the z-axis.

5. The computer-implemented method of claim 4, wherein:
   providing the plurality of options for manipulating the camera perspective comprises providing an option for manipulating a pitch of the camera perspective;
   the user interaction comprises an interaction with the option for manipulating the pitch of the camera perspective; and
   manipulating the camera perspective relative to the three-dimensional space comprises changing the pitch of the camera perspective.

6. The computer-implemented method of claim 5, wherein changing the pitch of the camera perspective comprises:
   changing the rotational coordinate of the camera perspective to change a vertical position of the horizon, the ground plane, and the three-dimensional object within the viewable portion of the three-dimensional space; and
   maintaining the positional coordinate of the camera perspective.

7. The computer-implemented method of claim 6, wherein:
   providing the plurality of options for manipulating the camera perspective comprises providing an option for manipulating a roll of the camera perspective;

the user interaction comprises an interaction with the option for manipulating the roll of the camera perspective; and manipulating the camera perspective relative to the three-dimensional space comprises changing the roll of the camera perspective.

8. The computer-implemented method of claim 7, wherein changing the roll of the camera perspective comprises:

changing the rotational coordinate of the camera perspective to rotate the horizon, the ground plane, and the three-dimensional object within the viewable portion of the three-dimensional space; and changing the positional coordinate of the camera perspective to maintain a coherent viewing perspective of the horizon, the ground plane, and the three-dimensional object.

9. The computer-implemented method of claim 8, wherein changing the rotational coordinate of the camera perspective to rotate the horizon, the ground plane, and the three-dimensional object within the viewable portion of the three-dimensional space comprises pivoting the camera perspective about a point where the horizon meets an edge of the user interface.

10. The computer-implemented method of claim 4, wherein:

providing the plurality of options for manipulating the camera perspective comprises providing an option for manipulating a yaw of the camera perspective;

the user interaction comprises an interaction with the option for manipulating the yaw of the camera perspective; and manipulating the camera perspective relative to the three-dimensional space comprises changing the yaw of the camera perspective.

11. The computer-implemented method of claim 10, wherein changing the yaw of the camera perspective comprises:

changing the positional coordinate and the rotational coordinate of the camera perspective to revolve the camera perspective about the y-axis around the three-dimensional object to maintain both a vertical position and a horizontal position of the horizon, the ground plane, and the three-dimensional object within the viewable portion of the three-dimensional space and to change an orientation of the ground plane and the three-dimensional object within the viewable portion of the three-dimensional space as the camera perspective revolves around the three-dimensional object.

12. The computer-implemented method of claim 10, wherein:

changing the positional coordinate comprises:
changing the positional x-axis value and the positional z-axis value to revolve the camera perspective about the y-axis around the three-dimensional object, and
maintaining the positional y-axis value to maintain the vertical position of the horizon, the ground plane, and the three-dimensional object; and changing the rotational coordinate comprises:
changing the rotational x-axis value, the rotational y-axis value, and the rotational z-axis value to, as the camera perspective revolves around the three-dimensional object, maintain both the vertical position and the horizontal position of the horizon, the ground plane, and the three-dimensional object within the viewable portion of the three-dimensional space and to change the orientation of the ground plane and the three-dimensional object within the viewable portion of the three-dimensional space, thereby changing a viewable portion of the three-dimensional object.

13. The computer-implemented method of claim 4, wherein:

providing the plurality of options for manipulating the camera perspective comprises providing an option for manipulating an altitude of the camera perspective;

the user interaction comprises an interaction with the option for manipulating the altitude of the camera perspective; and manipulating the camera perspective relative to the three-dimensional space comprises changing the altitude of the camera perspective.

14. The computer-implemented method of claim 13, wherein changing the altitude of the camera perspective comprises:

changing the positional coordinate of the camera perspective by changing the positional y-axis value to move the ground plane and the three-dimensional object in a vertical direction within the viewable portion of the three-dimensional space and to maintain a vertical position of the horizon within the viewable portion of the three-dimensional space, thereby changing a viewable portion of the three-dimensional object; and maintaining the rotational coordinate of the camera perspective.

15. The computer-implemented method of claim 1, further comprising:

detecting that the horizon spanning the three-dimensional space is outside of the viewable portion of the three-dimensional space;

providing, in response to detecting that the horizon is outside of the viewable portion, an indication that the horizon is outside of the viewable portion; and providing, by way of the user interface and in further response to detecting that the horizon is outside of the viewable portion, one or more off-screen options for manipulating the camera perspective relative to the three-dimensional space.

16. A system for manipulating a camera perspective relative to a three-dimensional space comprising a three-dimensional object, the system comprising:

at least one processor;

a memory comprising:
background digital image data; and
three-dimensional space data; and a server device comprising instructions thereon that, when executed by the at least one processor, cause the server device to:

analyze, by a processor of a camera perspective system, a background digital image to identify traits of the background digital image;

determine, by the processor of the camera perspective system and based on the traits of the background digital image, an alignment for rendering a horizon relative to the background digital image;

display, overlaid against the background digital image, a viewable portion of a three-dimensional space that is visible from a camera perspective of the three-dimensional space, the three-dimensional space extending beyond the viewable portion and comprising the horizon spanning the three-dimensional space and positioned according to the alignment relative to the background digital image, a ground plane extending from the horizon, and a three-dimensional object positioned relative to the ground plane;

provide, to a user by way of a user interface, a plurality of options for manipulating the camera perspective of the three-dimensional space to adjust the viewable portion of the three-dimensional space overlaid against the background image;

receive a user interaction with one of the plurality of options for manipulating the camera perspective of the three-dimensional space; and manipulate, in response to and in accordance with the user interaction, the camera perspective of the three-dimensional space to adjust the viewable portion of the three-dimensional space relative to the horizon, the ground plane, and the three-dimensional object of the three-dimensional space.

17. A non-transitory computer readable medium comprising instructions that, when executed by at least one processor, cause a computing device to:

analyze, by a processor of a camera perspective system, a background digital image to identify traits of the background digital image;

determine, by the processor of the camera perspective system and based on the traits of the background digital image, an alignment for rendering a horizon relative to the background digital image;

display, overlaid against the background digital image, a viewable portion of a three-dimensional space that is visible from a camera perspective of the three-dimensional space, the three-dimensional space extending beyond the viewable portion and comprising the horizon spanning the three-dimensional space and positioned according to the alignment relative to the background digital image, a ground plane extending from the horizon, and a three-dimensional object positioned relative to the ground plane;

provide, to a user by way of a user interface, a plurality of options for manipulating the camera perspective of the three-dimensional space to adjust the viewable portion of the three-dimensional space overlaid against the background image;

receive a user interaction with one of the plurality of options for manipulating the camera perspective of the three-dimensional space; and manipulate, in response to and in accordance with the user interaction, the camera perspective of the three-dimensional space to adjust the viewable portion of the three-dimensional space relative to the horizon, the ground plane, and the three-dimensional object of the three-dimensional space.

18. The non-transitory computer readable medium of claim 17, further comprising instructions that, when executed by the at least one processor, cause the computing device to manipulate the camera perspective relative to the three-dimensional space by changing at least one of a positional coordinate of the camera perspective or a rotational coordinate of the camera perspective.

19. The non-transitory computer readable medium of claim 17, further comprising instructions that, when executed by the at least one processor, cause the computing device to provide the plurality of options for manipulating the camera perspective by providing an option for manipulating a pitch of the camera perspective.

20. The non-transitory computer readable medium of claim 17, further comprising instructions that, when executed by the at least one processor, cause the computing device to provide the plurality of options for manipulating the camera perspective by providing an option for manipulating a roll of the camera perspective.

* * * * *